(12) United States Patent
Adams et al.

(10) Patent No.: US 12,029,244 B2
(45) Date of Patent: Jul. 9, 2024

(54) SMOKING APPARATUS

(71) Applicant: Imperial Tobacco Ventures Limited, Bristol (GB)

(72) Inventors: James Adams, Amsterdam (NL); Christopher Callaghan, Hamburg (DE); Andreas Beer, Munich (DE)

(73) Assignee: Imperial Tobacco Limited, Bristol (GB)

( * ) Notice: Subject to any disclaimer, the term of this patent is extended or adjusted under 35 U.S.C. 154(b) by 879 days.

(21) Appl. No.: 16/975,050

(22) PCT Filed: Feb. 27, 2019

(86) PCT No.: PCT/EP2019/054848
§ 371 (c)(1),
(2) Date: Aug. 21, 2020

(87) PCT Pub. No.: WO2019/166485
PCT Pub. Date: Sep. 6, 2019

(65) Prior Publication Data
US 2020/0397056 A1 Dec. 24, 2020

(30) Foreign Application Priority Data
Feb. 27, 2018 (EP) .................................... 18159021

(51) Int. Cl.
*A24F 40/40* (2020.01)
*A24F 40/90* (2020.01)
(Continued)

(52) U.S. Cl.
CPC .............. *A24F 40/40* (2020.01); *A24F 40/90* (2020.01); *A24F 40/95* (2020.01); *H02J 7/0045* (2013.01); *A24F 40/20* (2020.01)

(58) Field of Classification Search
CPC .......... A24F 40/40; A24F 40/90; A24F 40/95; A24F 40/20; H02J 7/0045; H02J 7/34; H02J 7/0042
(Continued)

(56) References Cited

U.S. PATENT DOCUMENTS 11,571,019 B2 * 2/2023 Murison ............... B67D 7/0288
11,690,408 B2 * 7/2023 Memari ................. H02J 50/10
141/2
(Continued)

FOREIGN PATENT DOCUMENTS

| CN | 104105417 A | 10/2014 |
|---|---|---|
| CN | 104135877 A | 11/2014 |

(Continued)

*Primary Examiner* — Alexander Gilman
(74) *Attorney, Agent, or Firm* — Dykema Gossett PLLC

(57) ABSTRACT

It is provided a smoking apparatus (500) adapted to heat a solid smokable material (100) to volatilize at least one component thereof. The apparatus (500) comprises a mobile charging part (400) comprising a first battery (410) and a first charging connector (420). Furthermore, the apparatus (500) comprises a smoking device (300) comprising a second battery (310) electrically connected to a processing unit (315) and to a second charging connector (320), and a heater (340) operable to heat solid smokable material (100) received within the receiving structure (330). The processing unit (315) is configured to cause that the heater (340) is provided with energy stored in the first battery (410) in a state in which the first and second charging connector (420, 320) are electrically connected to each other.

20 Claims, 16 Drawing Sheets

(51) Int. Cl.
*A24F 40/95* (2020.01)
*H02J 7/00* (2006.01)
*A24F 40/20* (2020.01)

(58) Field of Classification Search
USPC .......................................................... 131/329
See application file for complete search history.

(56) References Cited

U.S. PATENT DOCUMENTS

| | | | | |
|---|---|---|---|---|
| 2015/0020831 A1* | 1/2015 | Weigensberg | .......... | A24F 40/90 |
| | | | | 131/329 |
| 2015/0093695 A1* | 4/2015 | Tomono | ................ | G03G 5/105 |
| | | | | 430/58.35 |
| 2015/0305409 A1* | 10/2015 | Verleur | ................. | A61M 15/06 |
| | | | | 131/329 |
| 2015/0313287 A1* | 11/2015 | Verleur | .................. | A24F 40/42 |
| | | | | 131/329 |
| 2016/0345628 A1 | 12/2016 | Sabet | | |
| 2017/0233114 A1* | 8/2017 | Christensen | .............. | B65B 3/14 |
| | | | | 141/2 |

FOREIGN PATENT DOCUMENTS

| | | |
|---|---|---|
| CN | 205542975 U | 8/2016 |
| DE | 102013012290 A1 | 1/2015 |
| EP | 2668858 A1 | 12/2013 |
| EP | 2878214 A1 | 6/2015 |
| EP | 3092909 A1 | 11/2016 |
| EP | 3586655 A1 | 1/2020 |
| JP | 2015-500647 A | 1/2015 |
| JP | 2015-504669 A | 2/2015 |
| JP | 2017-513513 A | 6/2017 |
| RU | 2619016 C2 | 5/2017 |
| RU | 2620751 C2 | 5/2017 |
| WO | 2013093695 A1 | 6/2013 |
| WO | 2016/023711 A1 | 2/2016 |
| WO | 2017/194766 A1 | 11/2017 |
| WO | 2018/001910 A1 | 1/2018 |

* cited by examiner

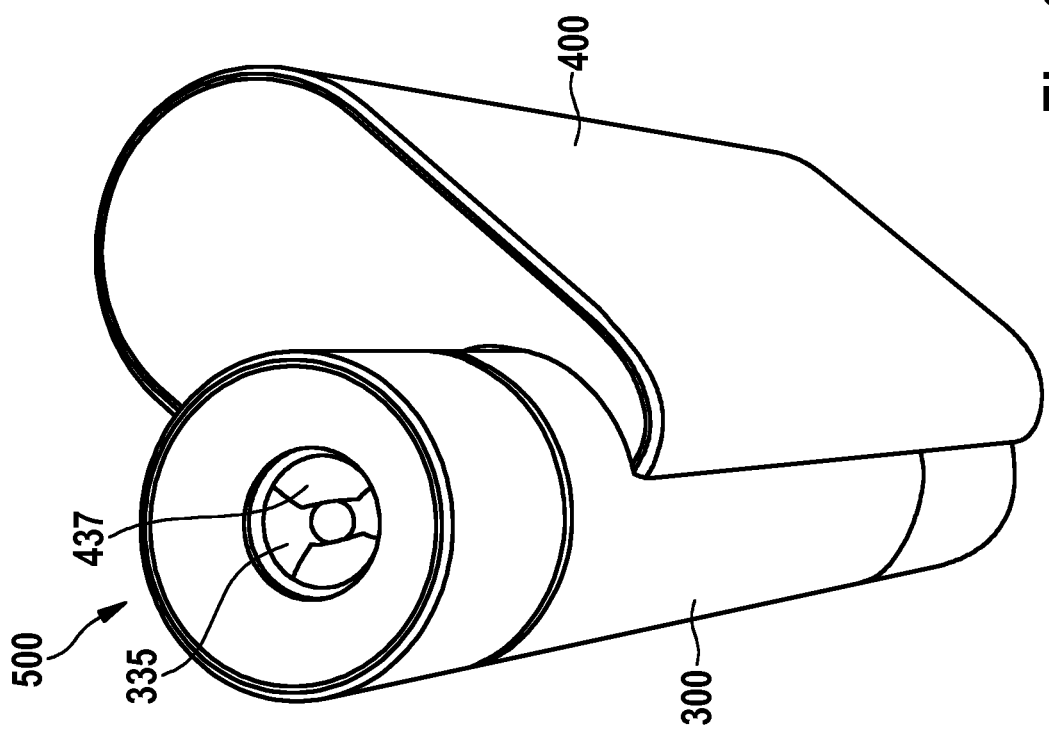
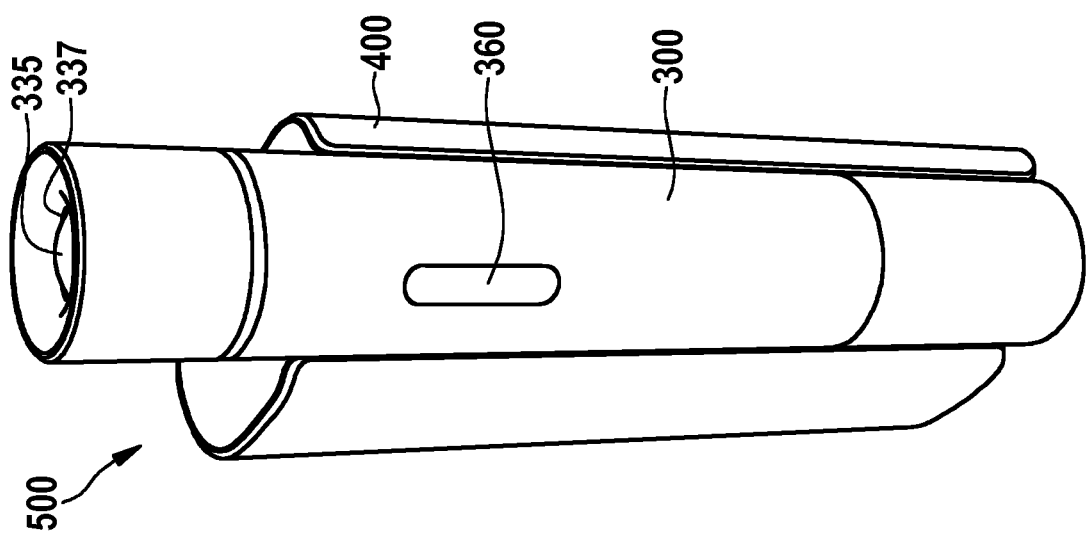
Fig. 2

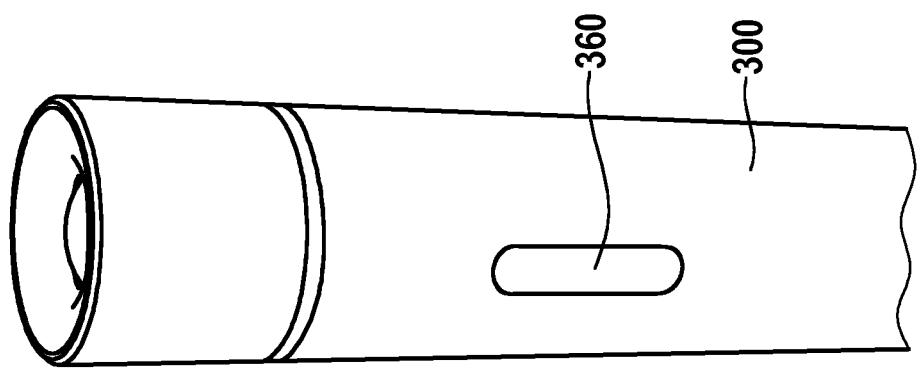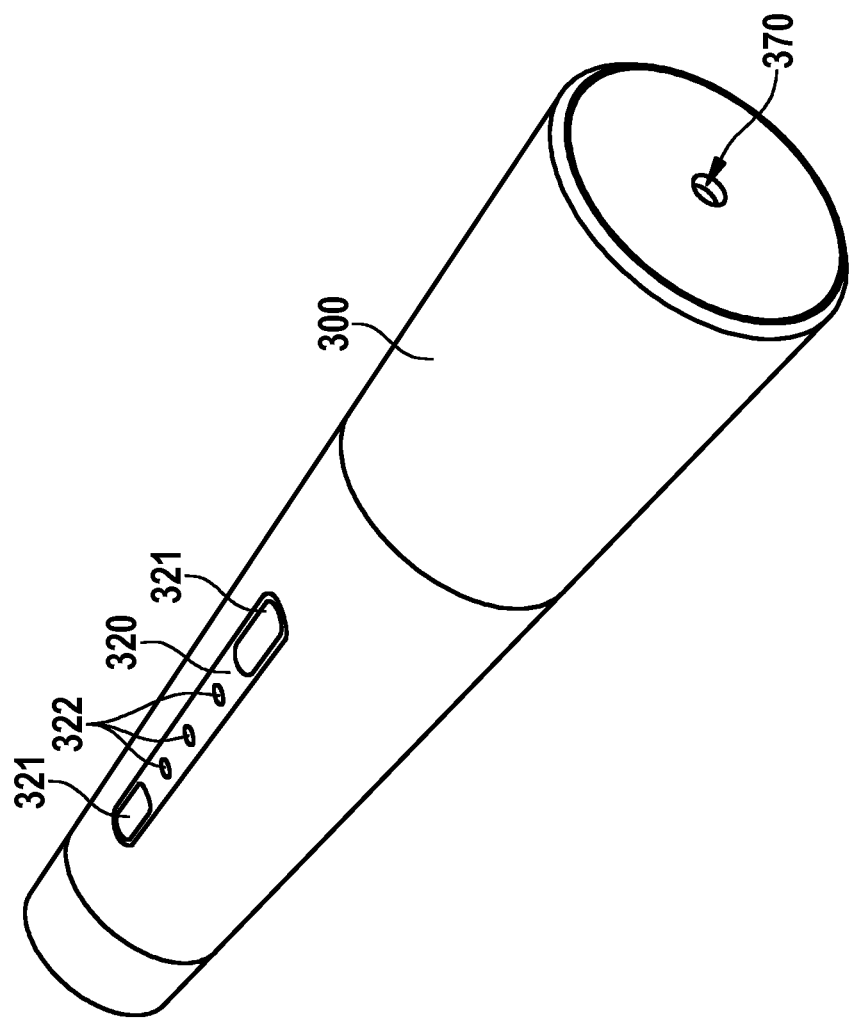
Fig. 3

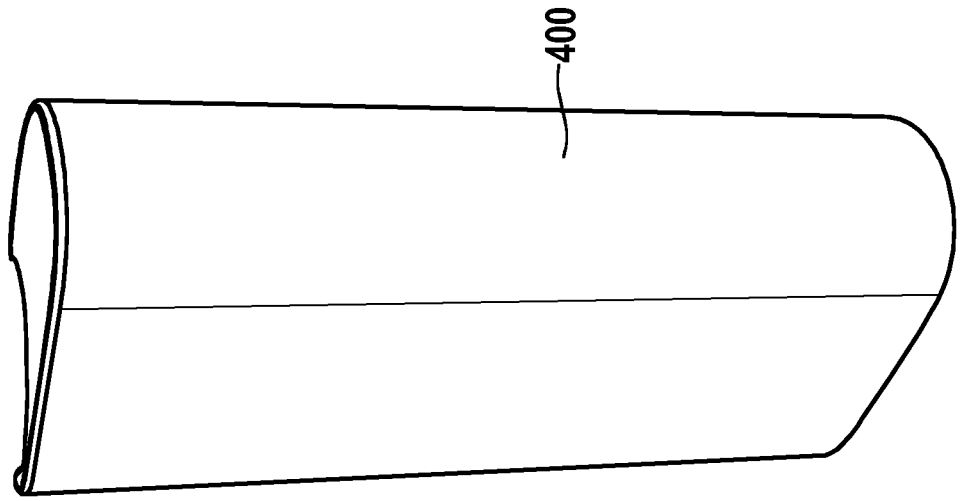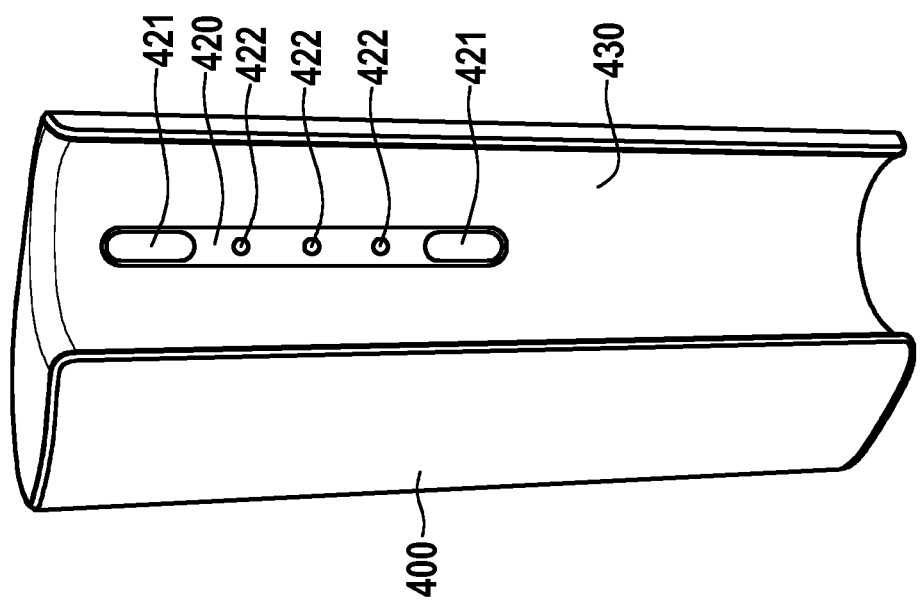
Fig. 4

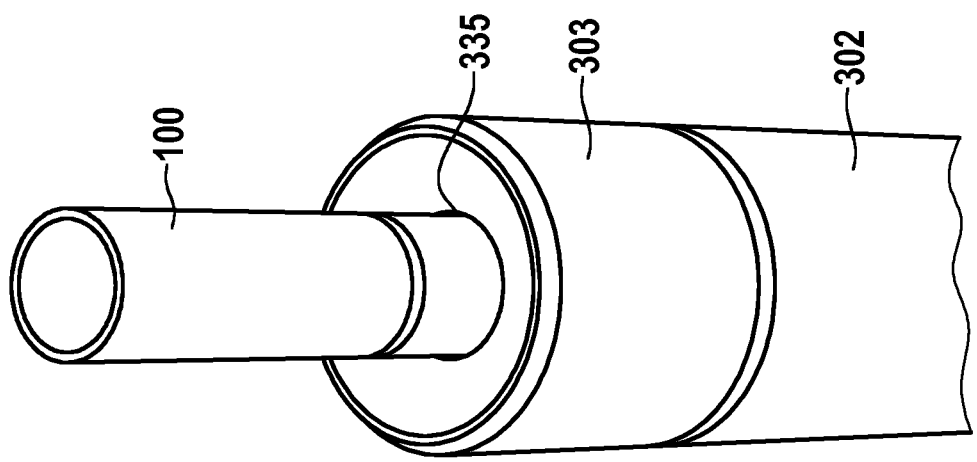
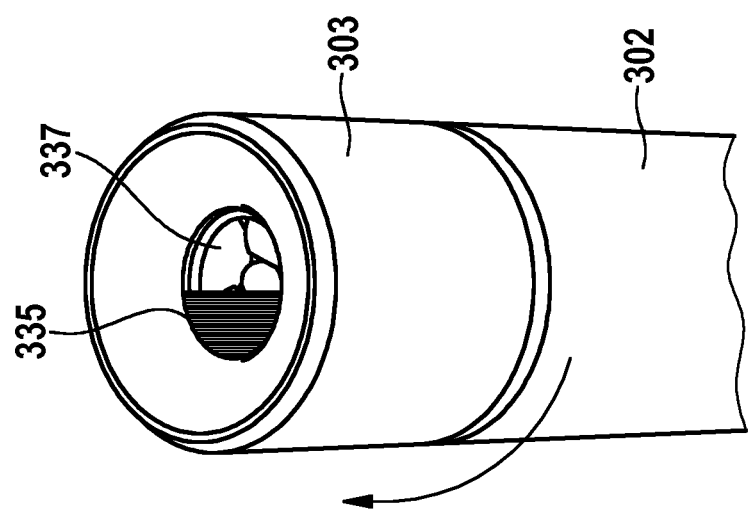
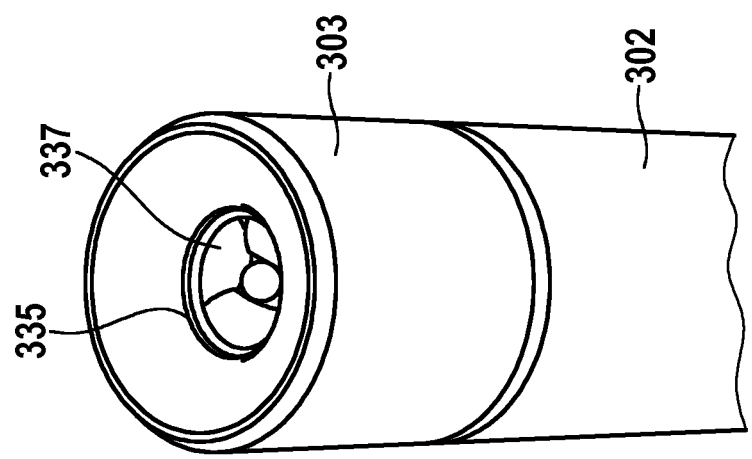
Fig. 5

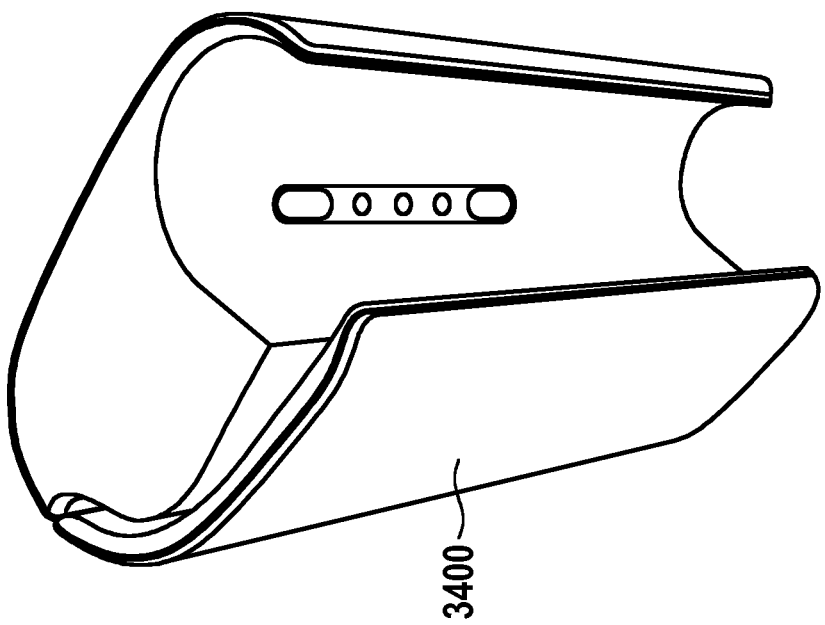
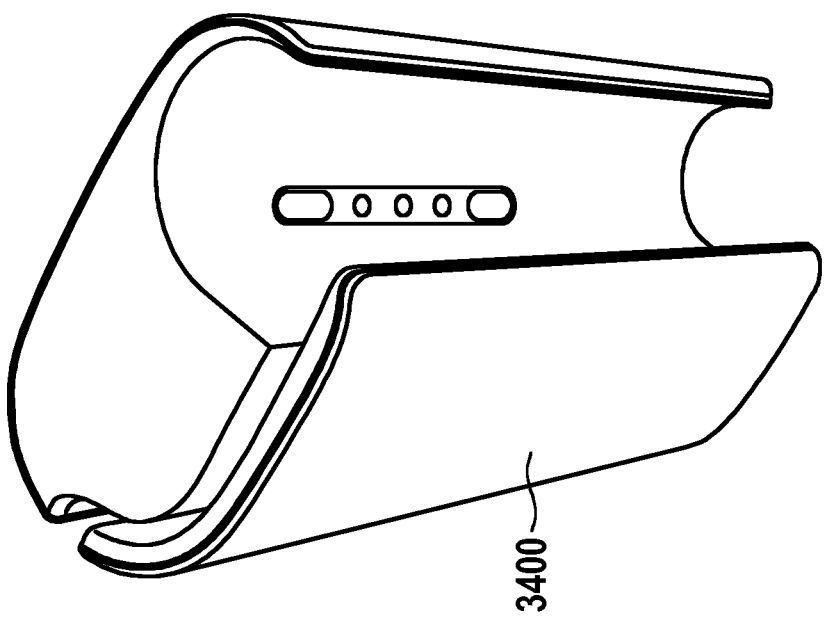
Fig. 15

SMOKING APPARATUS

CROSS-REFERENCE TO RELATED APPLICATIONS

This application is a National Stage Entry of International application no. PCT/EP2019/054848, filed on 27 Feb. 2019 (the '848 application) and published under International publication no. WO/2019/166485 on 6 Sep. 2019. This application claims priority to European patent application no. 18159021.7, filed 27 Feb. 2018 (the '021 application) and granted under European patent no. EP3530130B1 on 26 Aug. 2020. The '848 application and the '021 application are all hereby incorporated by reference as though fully set forth herein.

The present invention relates generally to a smoking apparatus adapted to heat a solid smokable material to volatilize at least one component thereof.

BACKGROUND OF THE INVENTION

In traditional smoking, tobacco contained in a (solid) smoking article, e.g. in a cigarette or in a cigar, is lighted with fire in order to produce smoke for smokers to inhale. The smoke produced during the combustion of tobacco contains harmful products and substances, which may cause serious respiratory illnesses for smokers.

In an effort to avoid the aforementioned generation of harmful products/substances, electronic cigarettes were developed which atomize/vaporize so called e-liquid at a high temperature to produce inhalable smoke. With the introduction of electronic cigarettes, the above shortcomings of traditional cigarettes were overcome. However, the e-liquid of electronic cigarettes is made of humectants, flavor, fragrance etc. and some consumers have the impression that conventional electronic cigarettes do not fully replicate the sensation of smoking a traditional cigarette the sensation of smoking a real cigarette. By many users, the smoke of an electronic cigarette is described to be tasteless and lacking tobacco aroma. For the aforementioned reasons, electronic cigarettes are not accepted by a plurality of consumers.

To bring back the sensation of smoking a real cigarette while simultaneously avoiding/substantially reducing the generation of harmful products/substances, so called "heat-not-burn" devices were developed which allow to heat but not burn a—mostly solid—tobacco product (oftentimes provided in a so called "heat stick") to temperatures which are substantially lower than the temperatures reached during a combustion of tobacco in the process of traditional smoking. In more detail, many "heat-not-burn" devices allow for a user to directly drag smoke from a heated (solid) smoking article that may have the shape of a (small) cigarette, the smoking article being heated to a temperature that is sufficient to release the desired substances/products but below a threshold temperature at which harmful products/substances are released.

Most "heat-not-burn" devices are provided with an integrated rechargeable battery that is adapted to power a heater of the "heat-not-burn" device, wherein the energy stored within the battery merely lasts for a predefined duration of time or for a predetermined number of puffs. When the rechargeable battery of the "heat-not-burn" device is discharged, it needs to be charged again to allow for the consumption of further smoking articles/"heat sticks". In order to charge a "heat-not-burn" device, the same is often placed within a stationary or mobile charger that is either connected to a power source (stationary) or comprises an own, mostly larger rechargeable power source (mobile) with a higher storage capacity for energy/power.

When the "heat-not-burn" device is connected to such a charger, the battery of the "heat-not-burn" device is (re-)charged. However, during the process of (re-)charging of the "heat-not-burn" device, further smoking articles may not be consumed which may be inconvenient for users/smokers/consumers who have to wait for the battery of the "heat-not-burn" device to be charged at least to a predetermined state of charge (SOC).

Hence, with the "heat-not-burn" devices of the state of the art, it is not possible for a user to consume several sticks in succession.

SUMMARY OF THE INVENTION

In accordance with one aspect of the present invention, there is provided a smoking apparatus adapted to heat a solid smokable material (e.g. aerosol generating substrate) to volatilize at least one component thereof. The smoking apparatus comprises a mobile charging part provided in a first shell. The mobile charging part comprises a first battery and a first charging connector electrically connected to the first battery. The smoking apparatus further comprises a smoking device provided in a second shell being separate from the first shell. The smoking device comprises a second battery electrically connected to a processing unit and to a second charging connector electrically connectable to the first charging connector. The smoking device further comprises a receiving structure adapted to removably receive solid smokable material, and a heater operable to heat solid smokable material received within the receiving structure. The processing unit is configured to cause that the heater is provided with energy stored in the first battery in a state in which the first and second charging connector are electrically connected to each other.

The characteristics, features and advantages of this invention and the manner in which they are obtained as described above, will become more apparent and be more clearly understood in connection with the following description of exemplary embodiments, which are explained with reference to the accompanying drawings.

BRIEF DESCRIPTION OF THE DRAWINGS

In the drawings, same element numbers indicate same elements in each of the views:

FIG. 2 shows two different illustrations of the first embodiment of a smoking apparatus in different perspectives;

FIG. 3 shows two different illustrations of the smoking device of the first embodiment of a smoking apparatus;

FIG. 4 shows two different illustrations of the mobile charging part of the first embodiment of a smoking apparatus;

FIG. 5 shows the actuation of a closing mechanism mounted in the smoking device of the first embodiment of a smoking apparatus;

FIG. 15 shows the mobile charging part of the fourth embodiment of a smoking apparatus.

DESCRIPTION OF THE PREFERRED EMBODIMENTS

Figure 1:
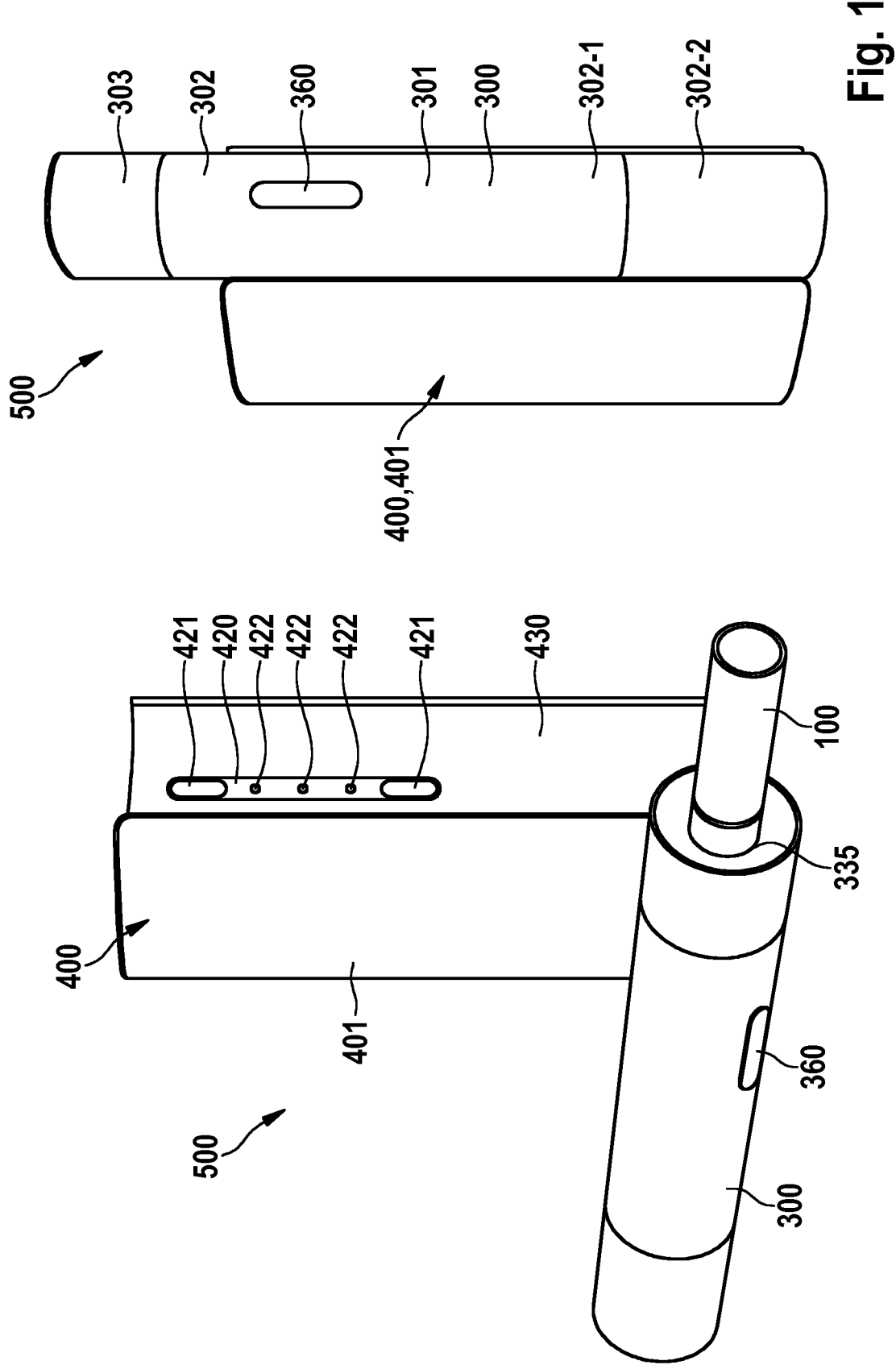
FIG. 1 shows two different illustrations of a first embodiment of a smoking apparatus in two different states.

As used herein, the term solid smokable material 100 includes materials that provide volatilised components upon heating, typically in the form of an aerosol. Solid smokable material 100 includes any tobacco-containing material and may, for example, include one or more of tobacco, tobacco derivatives, expanded tobacco, reconstituted tobacco or any tobacco substitutes. Furthermore, solid smokable material 100 may contain flavored or non-flavored material. Solid smokable material 100 may also include other products, especially non-tobacco products, which—depending on the product—may or may not contain nicotine. Solid smokable material 100 may also include a gel, a wax or the like. Furthermore, solid smokable material 100 may for example be provided in a cigarette or within a heat stick, containing for example tobacco shreds or the like.

In FIGS. 1 to 11 and 16, a first embodiment of a smoking apparatus 500 is illustrated which is adapted to heat a solid smokable material 100 to volatilize at least one component of the solid smokable material, typically to form an aerosol which can be inhaled, without burning or combusting the solid smokable material. The apparatus 500 illustrated in FIGS. 1 to 11 and 16 may also be described as a "heat-not-burn" apparatus, as a "tobacco heating product", as a "tobacco heating device" or similar. The smoking apparatus 500 comprises a mobile charging part 400 provided in a first shell 401 and a smoking device 300 provided in a second shell 301 being separate from the first shell 401. Expressed in other words, the mobile charging part 400 of the smoking apparatus 500 and the smoking device 300 of the smoking apparatus 500 are independent components which together form or provide for the smoking apparatus 500. Both, the mobile charging part 400 and the smoking device 300, are mobile components which may be carried around by a user of the smoking apparatus 500. The mobile charging part 400 represents a mobile charger, a mobile docking station or a mobile charging station for the smoking device 300. Said mobile charging part may include e.g. a secondary battery, a booster battery and/or a back-up battery. The smoking device 300 allows for a user/smoker/consumer to smoke/consume solid smokable material 100, especially heat sticks, which will be described in more detail further below.

In this first embodiment, the smoking device 300 substantially has a tubular shape. Expressed in other words, the smoking device 300 substantially has the shape of a circular rod, tube or stick. In this first exemplary embodiment, the smoking device 300 has an exemplary length of 109.2 mm. However, in other embodiments, the smoking device 300 may have a length in the range of 100 mm to 120 mm, especially in the range of 105 mm to 115 mm. Furthermore, the smoking device 300 may also have any other shape and dimension and is especially not bound/limited to a rod- or tube-shaped design. Furthermore, in this first embodiment, the smoking device 300 exemplarily has a diameter of 18 mm. However, in other embodiments, the smoking device 300 may have a diameter in the range of 15 mm to 20 mm, especially in the range of 17 mm to 19 mm. Further, the dimensions of the smoking device 300 are not bound/limited to these ranges and the smoking device 300 may also have any other diameter.

The mobile charging part 400 in this first embodiment exemplarily has a substantially prismatic or cuboid shape with rounded edges/corners. Moreover, in this first embodiment, the mobile charging part 400 is elongate and exemplarily has a length of 86.6 mm. However, it may also have a length in the range of 70 mm to 100 mm, especially in the range of 80 mm to 90 mm or it may have any other length. Moreover, in this first embodiment, the mobile charging part 400 exemplarily has a width of 41.2 mm. However, it may also have a width in the range of 30 mm to 50 mm or any other width which is not in the aforementioned range.

The aforementioned second shell 301 of the smoking device 300 of the smoking apparatus 500 represents the housing of the smoking device 300 and houses the components thereof. The aforementioned first shell 401 of the mobile charging part 400 of the smoking apparatus 500 represents the housing of the mobile charging part 400 and houses the components thereof. In this first embodiment, the first and the second shell 401, 301 comprise a plastic material, respectively. However, they may also comprise or be made of any other material, e.g. of aluminium, steel, wood or any other material suitable to house the components arranged therein, respectively.

In this first embodiment, the first shell 401 of the mobile charging part 400 comprises/houses a receiving section 430, the receiving section 430 being adapted to removably receive the second shell 301 therein and hence the smoking device 300. In such an embodiment, the smoking device 300 may easily be carried around within the mobile charging part 400. Expressed in other words, the receiving section 430—which will be described in more detail further below—is adapted to receive, hold and releasably fasten the smoking device 300 therein. In this first embodiment, the smoking device 300 may be placed, e.g. may slide into the receiving section 430 of the mobile charging part 400, such that it is attached and fixed to the mobile charging part 400, in order for the mobile charging part 400 to hold the smoking device 300. In this first embodiment, the receiving section 430 has a shape that is in part adjusted to the outer shape of a part of the second shell 301. An advantage of such an adjustment of the shapes of said components is that the smoking device 300 easily engages with the receiving section 430 of the mobile charging part 400. Expressed in other words, in this first embodiment, the shape of the smoking device 300 is adjusted to the shape of the receiving section 430, such that the smoking device 300 engages with the receiving section 430 when the smoking device 300 is inserted therein. Moreover, in this first embodiment, the receiving section 430 is substantially C-shaped wherein the second shell 301 is substantially rod-shaped. In more detail, the second shell 301 has a substantially circular cross-section which is substantially constant across the length of the smoking device 300. Expressed in other words, the second shell 301 is substantially O-shaped. In such an embodiment, the rod-shaped smoking device 300 may easily be slidden into the C-shaped receiving section 430 of the mobile charging part 400. However, also other shapes of the first and second shell 401, 301 may be realized and embodiments of smoking apparatuses exist in which mobile charging parts 400 are provided without a receiving section 430. Furthermore, an apparatus 500 may be provided with a receiving section that has any other shape, e.g. a U-shape, an L-shape, a V-shape or any other shape.

Thus, when the smoking device 300 is inserted into the mobile charging part 400, the smoking device 300 and the mobile charging part 400 are connected to each other by virtue of a form-fit connection. On the left side of FIG. 1, the smoking device 300 and the mobile charging part 400 are illustrated in a state in which they are separated and hence not attached to one another. In the state of the apparatus 500 illustrated on the left side of FIG. 1, the receiving section 430 is clearly visible, whereas it is covered by the smoking device 300 in the state of the apparatus 500 illustrated on the right side of FIG. 1. On the right side of FIG. 1, but also in FIG. 2, the smoking device 300 and the mobile charging part 400 are illustrated in a state in which they are not separated and hence attached to one another by virtue of said form-fit connection. However, also other types of connections between the mobile charging part 400 and the smoking device 300 may be realized.

Figure 16:
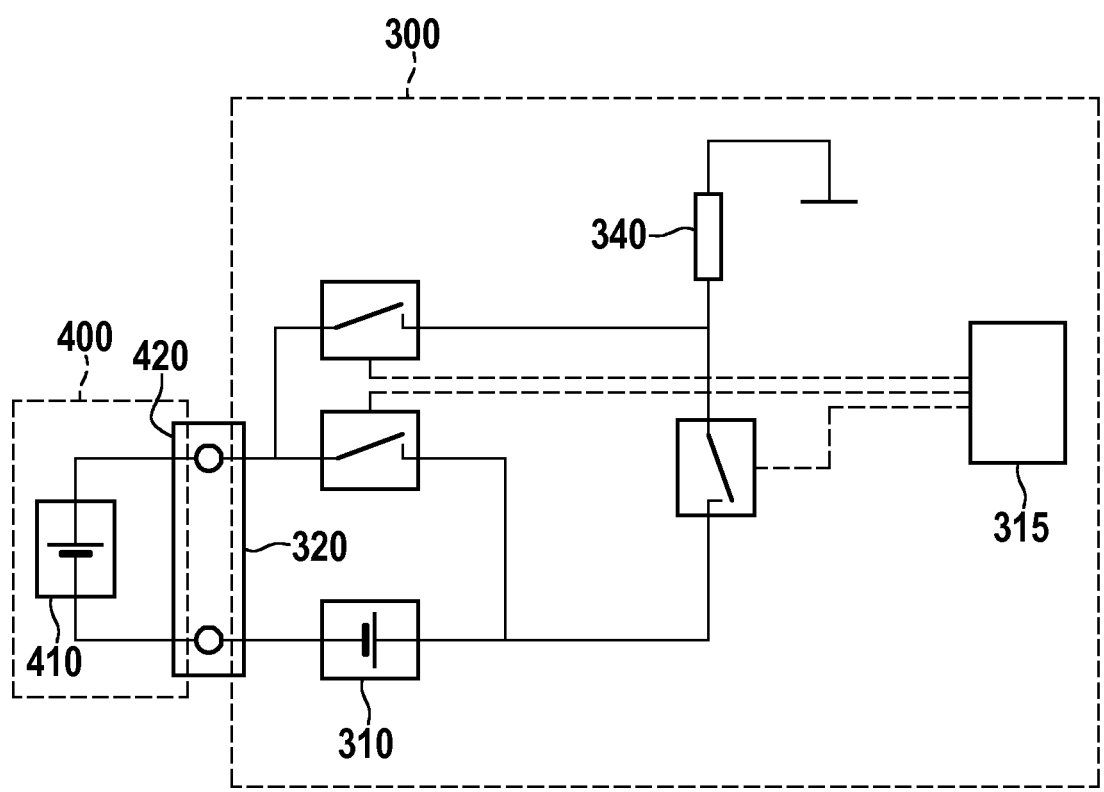
FIG. 16 shows a simplified electrical circuit indicating how the components of the mobile charging part and the smoking device are electrically connected in a state in which the first and second charging connector are electrically connected to each other.

The mobile charging part 400 of the smoking apparatus 500 comprises a first battery 410 (see FIGS. 9 and 16), and a first charging connector 420 (see FIGS. 1 and 4) electrically connected to the first battery 410 (see FIG. 16). The smoking device 300 comprises a second battery 310 (see FIGS. 10 and 16) electrically connected to a processing unit 315 (see FIG. 10) and to a second charging connector 320 (see FIG. 3, left) electrically connectable to the first charging connector 420. The smoking device 300 further comprises a receiving structure 330 (see FIGS. 7, 10 and 11) adapted to removably receive solid smokable material 100, and a heater 340 (see FIG. 11) operable to heat solid smokable material 100 received within the receiving structure 330. A heat stick may be inserted into the receiving structure 330 to be consumed/smoked and may be retracted from the receiving structure 330 again, e.g. after it has been smoked.

The smoking device 300 further comprises an opening 335 (see FIGS. 1, 2, and 5) which in this first embodiment is exemplarily arranged within a circular shaped wall at the top of the second shell 301 of the smoking device 300. The opening 335 is adjusted in shape to the circumference of the solid smokable material 100/heat sticks which are consumable via the smoking device 300, such that the rim of the opening 335 substantially corresponds to the outer circumference of a heat stick consumable via the smoking device 300. As mentioned before, in this first embodiment, the solid smokable material 100 corresponds to a short, rod-shaped heat stick which substantially has the shape of a small cigarette. These heat sticks may or may not comprise a filter.

A heat stick is inserted through the opening 335 and pushed into the aforementioned receiving structure 330 which itself is arranged within a heating chamber 345 (see FIGS. 10 and 11) that is positioned below the opening 335, which will be described in more detail further below. When a heat stick is fully inserted into the aforementioned receiving structure 330, a part of the heat stick extends out of the opening 335 which allows for the user/smoker/consumer to drag smoke directly out of the heat stick when the same is heated.

An air inlet 370 (see FIG. 3, left) is exemplarily arranged within a circular shaped wall at the bottom of the second shell 301 of the smoking device 300 which allows for air to be dragged through the entire smoking device 300, through a heat stick inserted into the receiving structure 330 and into the mouth of a user/smoker/consumer. Air that is dragged into the air inlet 370 is heated within the heating chamber 345 such that smoke entering the mouth of a user/smoker/consumer has a predetermined temperature.

Figure 10:
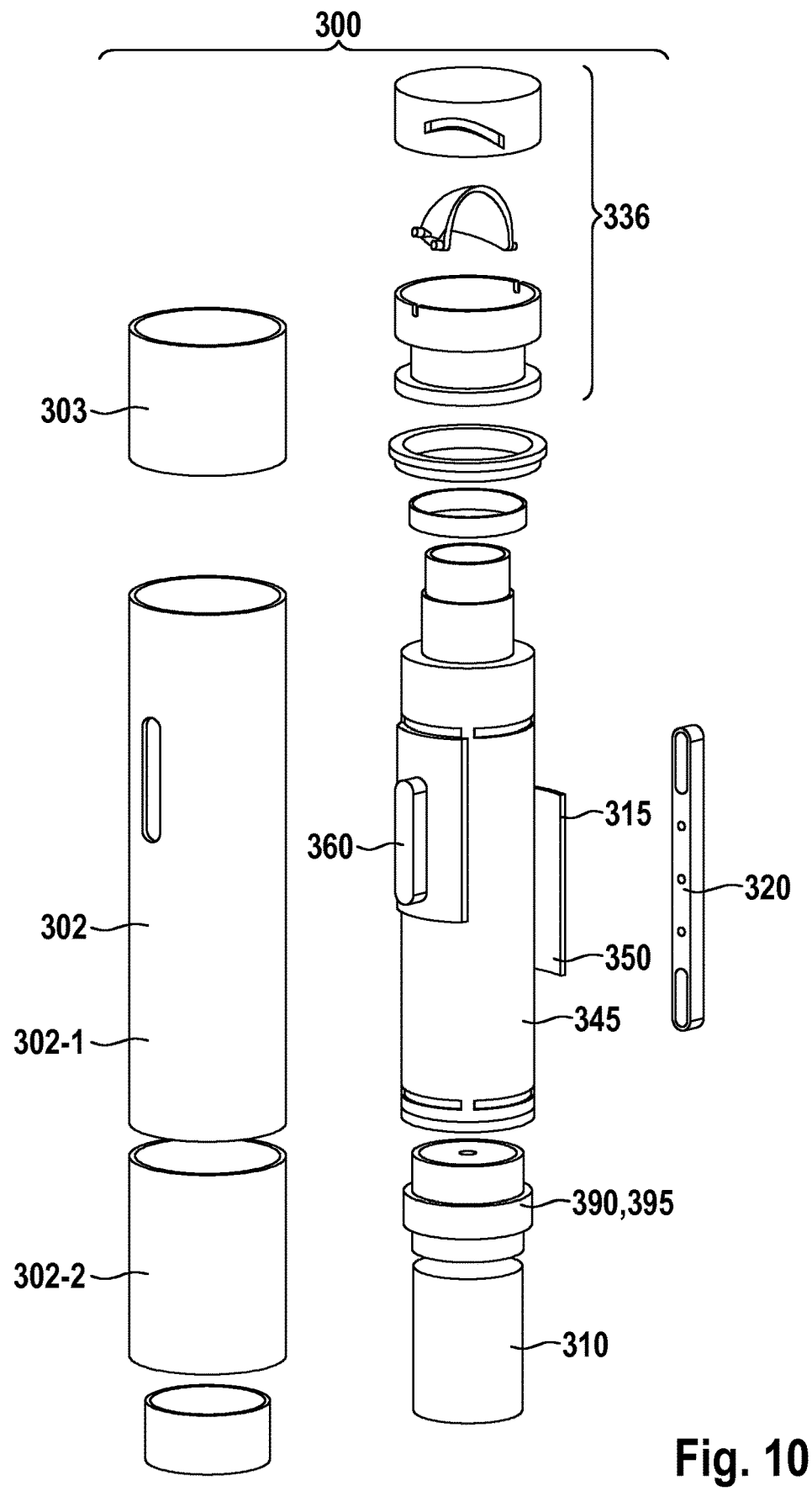
FIG. 10 shows an exploded view of the smoking device of the first embodiment of a smoking apparatus.
Figure 11:
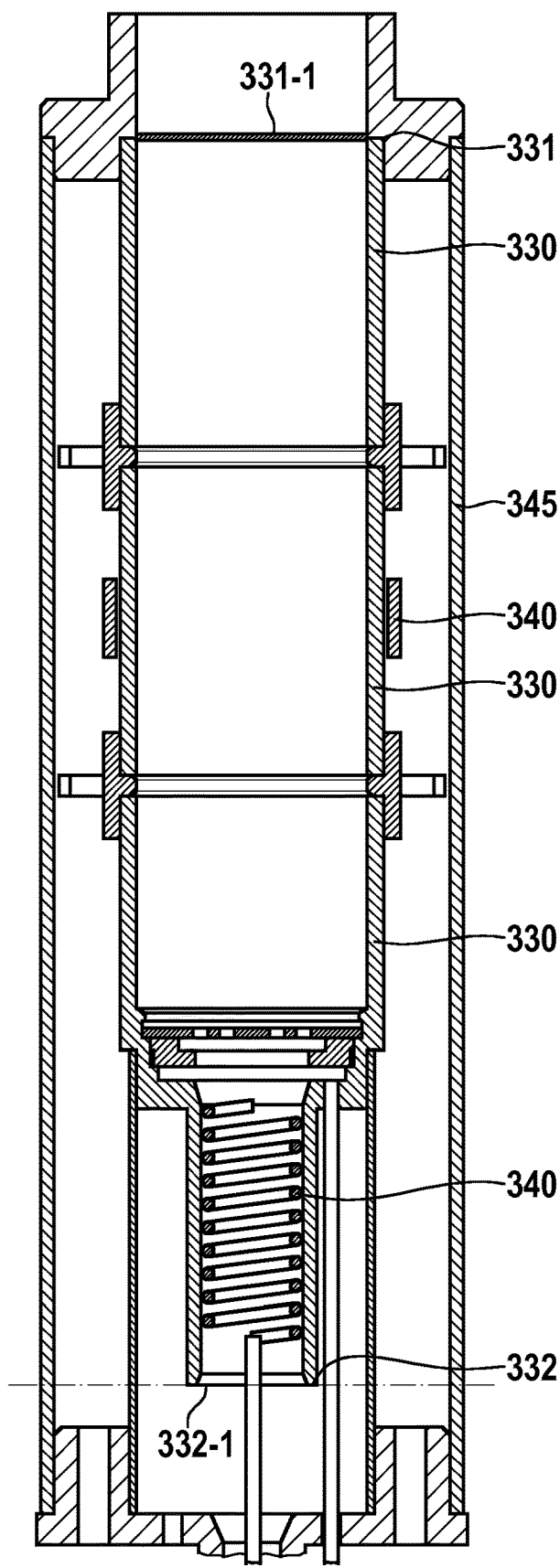
FIG. 11 shows a schematic illustration of one possible realization of the heating chamber of the smoking device of the first embodiment of a smoking apparatus.

The heating chamber 345, the heater 340 and the receiving structure 330 are shown in detail in FIG. 11. The heater 340 and the receiving structure 330 are realized within the heating chamber 345, which may be best appreciated in FIGS. 10 and 11.

In this first embodiment, the heating chamber 345 is exemplarily made of a metal to prevent heat generated therein via the heater 340 from dissipating. However, the heating chamber 345—in other embodiments—may also be made of or comprise any other material. The heating chamber 345 substantially has the shape of a sealed tube with a constant diameter across a substantial part of the length of the same. The heating chamber 345 exemplarily substantially concentrically surrounds/encloses the receiving structure 330, which represents a support or holding structure or heating canister for the aforementioned heat sticks. In this first embodiment, the receiving structure 330 also has a tubular shape with an inner diameter that substantially corresponds to the outer diameter of the heat sticks usable with the smoking device 300, as has been mentioned before. In this first embodiment, the receiving structure 330 is exemplarily also made of a metallic material. However, it may also merely comprise a metallic material or be made of or comprise any other material. Moreover, in this first embodiment, the receiving structure 330 comprises a first end 331 with a first opening 331-1 facing the opening 335 arranged within the circular shaped wall at the top of the second shell 301 of the smoking device 300 and a second end 332 opposing the first end 331. The first opening 331-1 of the receiving structure 330 is aligned with an opening at the top of the heating chamber 345 and with the opening 335 arranged within the second shell 301.

In this first embodiment, the heater 340 exemplarily comprises two heating elements. Alternatively, two heaters 340 may be provided, each having at least one heating element. A first heating element corresponds to a coil heater that is arranged in a tapering section of the receiving structure 330, said tapering section having a diameter that is smaller than the diameter of the heat sticks. As the coil heater is entirely arranged within said tapering section of the receiving structure 330 which extends across a length that is greater than the length of the coil heater, the coil heater is not in contact with the heat stick when the same is fully arranged within/inserted into the receiving structure 330. The coil heater heats up air that may be dragged into and through a heat stick when the same is inserted into the receiving structure 330. Furthermore, a second heater, which in this embodiment exemplarily also corresponds to a coil heater, is exemplarily positioned, i.e. coiled around a center part of the receiving structure 330. In use, the second heater may heat up the receiving structure 330 and consequently the heat stick to release or volatilize at least one component thereof. Hence, throughout this disclosure, an operation of the heater 340 means an operation of the two heating elements which the heater 340 comprises. In this first embodiment, upon an activation of the heater 340, the two heating elements thereof are provided with power simultaneously. However, in other embodiments, they may be powered differently, e.g. in different intervals upon an activation of the heater 340.

Furthermore, also other embodiments may be realized comprising other receiving structures and other heaters, e.g. heaters with merely one or more than two heating elements which may also be positioned differently. Furthermore, also other types of heaters or heating elements may come to use, e.g. foil heaters, piercing element heaters, ceramic heating elements or any other types of heating elements or heaters.

As mentioned before, the smoking device 300 comprises a second battery 310 which is arranged within the second shell 301. The second battery 310 and its position may be best appreciated in FIG. 10. The second battery 310 in this first embodiment exemplarily corresponds to a rechargeable lithium-ion battery. However, any other rechargeable battery may come to use within the smoking device 300. In this first embodiment, the second battery 310 is arranged at a bottom of the second shell 301. Furthermore, the second battery 310 is electrically connected to the (heating elements of the) heater 340, wherein the processing unit 315, which may be best appreciated in FIG. 10 as well—in this first embodiment—is adapted to electrically connect the second battery 310 to the heater 340 to supply the heater 340 with energy stored in the second battery 310, upon an activation of the smoking device 300 performed by a user/smoker/consumer.

In this first embodiment, said activation is done either by the actuation of an actuation button 360, i.e. by pushing the actuation button 360 shown e.g. in FIG. 1, 2, 3 or 8, or by dragging air through the smoking device 300 which in this first embodiment exemplarily activates a puff-sensor 395 (see FIG. 10). In this first embodiment, the puff-sensor 395 is exemplarily arranged between the second battery 310 and the heating chamber 345, such that air dragged into the smoking device 300 is forced through and air flow channel 390 passing the puff-sensor 395.

However, the puff-sensor 395 and the actuation button 360 are merely optional. Hence, other activation elements adapted to activate the heater 340 may come to use in other embodiments of smoking apparatuses.

The second battery 310 of the smoking device 300 is electrically connected to the second charging connector 320, which in this first embodiment has an elongated strip-like frame and is accessible from an outside of the smoking device 300, the second charging connector 320 being integrated into the surface of the second shell 301 of the smoking device 300 which comprises a corresponding groove. The second charging connector 320 may be best appreciated in FIG. 3 (left). In this first embodiment, the second charging connector 320 exemplarily comprises three electric pins 322 or terminals which are adapted to conduct a current, and two magnetic elements 321 which serve to align the second charging connector 320 with the corresponding first charging connector 420 of the mobile charging part 400 when the first charging connector 420 is brought into close proximity to the second charging connector 320. In this first embodiment, the processing unit 315 is adapted to electrically interrupt the electrical connection between the second battery 310 and the second charging connector 320 by actuating a switch arranged within the electrical path (see FIG. 16) connecting the second battery 310 to the second charging connector 320. However, this feature is merely optional and other embodiments may be realized in which the second battery 310 and the second charging connector 320 are constantly electrically connected to each other.

Moreover, in this first embodiment, the first battery 410 of the mobile charging part 400—the first battery 410 being arranged within the first shell 401—exemplarily also corresponds to a rechargeable lithium-ion battery. However, also for the first battery 410, any other rechargeable battery or battery type may be used. The first battery 410 may be best appreciated in FIG. 9. The first battery 410 is arranged within a battery holding frame 440 which itself—together with the first battery 410 therein—is arranged within a shell frame 450 which supports the first shell 401. As mentioned before, the first battery 410 is electrically connected to the first charging connector 420, which in this first embodiment is exemplarily identical with the second charging connector 320. Expressed in other words, also the first charging connector 420 comprises an elongated strip-like frame that is integrated into the first shell 401 and that is accessible from an outside of the mobile charging part 400.

In more detail, the first charging connector 420 is integrated into a corresponding groove provided within the surface of the first shell 401 of the mobile charging part 400, wherein the second charging connector 420 is positioned within the aforementioned receiving section 430. The first charging connector 420 may be best appreciated in FIG. 1 (left) and FIG. 4. In this first embodiment, also the first charging connector 420 exemplarily comprises three electric pins 422 or terminals which are adapted to conduct a current, and two magnetic elements 421 which serve to align the first charging connector 420 with the corresponding second charging connector 320 of the smoking device 300 when the first charging connector 420 is brought into close proximity to the second charging connector 320.

In some embodiments, also the mobile charging part 400 may additionally comprise a processing unit adapted to interrupt the electrical connection/the electrical path between the first charging connector 420 and the first battery 410 via the actuation of a switch arranged within the electrical path interconnecting these components. However, such a feature is also merely optional and embodiments of smoking apparatuses may be realized without such a switch.

When the first charging connector 420 is electrically connected to the second charging connector 320, the second battery 310 of the smoking device 300 may be charged via the first battery 410 of the mobile charging part 400, wherein the current is conducted from the first battery 410, via the first and second charging connectors 420, 320. In this first embodiment, this transfer of charge/energy from the first battery 410 to the second battery 310, i.e. the charging process of the second battery 310, is automatically initiated as soon as the first charging connector 420 is electrically connected to the second charging connector 320. However, in other embodiments, said transfer of charge/energy from the first battery 410 to the second battery 310, i.e. the charging process of the second battery 310 needs to be initiated separately, especially manually, e.g. by the actuation of a switch. In such embodiments, the charging process of the second battery 310 is not started/initiated automatically when the first charging connector 420 is electrically connected to the second charging connector 320.

The mentioned processing unit 315 of the smoking device 300—best appreciated in FIG. 10—in this first embodiment is exemplarily realized as an integrated circuit, IC, provided on a flexible printed circuit board, flex PCB, that in this first embodiment is exemplarily arranged adjacent to the second charging connector 320. However, the processing unit 315 of the smoking device 300 may also be realized on a non-flexible PCB, as a microprocessor, as a digital signal processor, as a microcontroller, as a digital microcontroller, as an application specific integrated circuit, ASIC, as an FPGA or as any other logical processing unit. Moreover, the processing unit 315 may also be arranged at a position that differs from the position of the processing unit shown in FIG. 10.

The processing unit 315 is configured to cause that the heater 340 is provided with energy stored in the first battery 410 in a state in which the first and second charging connector 420, 320 are electrically connected to each other. Expressed in other words, the processing unit 315 may cause that the heater 340 of the smoking device 300 is powered or operated via the first battery 410 of the mobile charging part 400.

In such an embodiment, a user/smoker/consumer does not need to wait for the second battery 310 of the smoking device 300 to be recharged when the same runs out of power/energy to smoke further heat sticks. Expressed in other words, the smoking apparatus 500 described herein allows a user to consume several sticks in succession, as energy of the first battery 410 is available when the second battery 310 of the smoking device 300 is discharged. Hence, when a user/smoker/consumer is on the road or e.g. in a forest without connection to a stationary power source or to a local power grid, and smoking heat sticks via the smoking device 300, the user/smoker/consumer may continue smoking heat sticks even when the second battery 310 of the smoking device 300 is empty. In order to do so, the user/smoker/consumer simply electrically connects the first charging connector 420 to the second charging connector 320. In this first embodiment, upon such an electrical connection between the first charging connector 420 and the second charging connector 320, the heater 340 of the smoking device 300 is immediately and automatically provided with energy/power stored in the first battery 410.

However, in other embodiments of smoking apparatuses, the aforementioned transfer of energy or power from the first battery 410 of the mobile charging part 400 to the heater 340 of the smoking device 300 is merely enabled via the electrical connection between the first charging connector 420 and the second charging connector 320, but needs to be initiated separately, e.g. via the actuation of the actuation button 360, via an actuation by virtue of the puff-sensor 395 or via any other actuation or activation, e.g. performable via a separate/other button provided on the mobile charging part 400 or the smoking device 300. Hence, in such other embodiments, the heater 340 of the smoking device 300 is merely operated via the first battery 410 when the first charging connector 420 and the second charging connector 320 are electrically connected to each other and (as a cumulative condition) when the operation of the heater 340 via the first battery 410 is triggered/initiated via a specific actuation.

In this first embodiment, the second battery 310 is chargeable via the first battery 410, wherein the processing unit 315 is configured to allow for the heater 340 to be operated while the second battery 310 is charged via the first battery 410, in a state, in which the first and second charging connector 420, 320 are connected to each other. Hence, in this first embodiment, when the first and second charging connector 420, 320 are connected to each other, the heater 340 may be provided with energy/power simultaneous to a recharging of the second battery 310 via the first battery 410. This allows for a user/smoker/consumer to advantageously smoke—using the smoking device 300—while the second battery 310 is electrically recharged via the first battery 410. Hence, a user/smoker/consumer who wants to continue smoking heat sticks after the second battery 310 ran out of energy/power does a) not have to wait until the second battery 310 has been (fully) recharged to smoke again and b) further does not have to postpone the process of recharging the second battery 310 to a point in time at which the user/smoker/consumer does not want to smoke anymore, as both—smoking and charging of the second battery 310—is possible at the same time.

Moreover, in this first embodiment, the processing unit 315 is configured to cause that the heater 340 is provided with energy stored in the first battery 410 while the second battery 310 is charged via the first battery 410 in a state in which the first and second charging connector 420, 320 are electrically connected to each other. Hence, in this first embodiment, the processing unit 315 is adapted to cause that the second battery 310 is provided with energy/power of the first battery 410 and that the heater 340 is simultaneously provided with energy/power of the first battery 410, when the first and second charging connector 420, 320 are electrically connected to each other. Thus, in this first embodiment, energy/power of the second battery 310 is advantageously not used to power the heater 340 of the smoking device 300 in a state in which the first and second charging connectors 420, 320 are electrically connected. However, in other embodiments, energy/power of the second battery 310 may also (additionally) be used to power the heater 340 of the smoking device 300 in a state in which the first and second charging connectors 420, 320 are electrically connected.

In this first embodiment, the heater 340—just as the second battery 310—is electrically connected to the second charging connector 320 via its own electrical path, wherein said electrical path electrically connecting the heater 340 to the second charging connector 320 comprises an electrical switch (see FIG. 16) which is actuable via the processing unit 315. In such an embodiment, both the provision of electrical energy/power from the first battery 410 to the heater 340 and the provision of electrical energy/power from the first battery 410 to the second battery 310 are individually controllable by a user/smoker/consumer respectively, wherein the user/smoker/consumer may separately activate the provision of electrical energy/power from the first battery 410 to the heater 340 independent of the provision of electrical energy/power from the first battery 410 to the second battery 310, respectively.

For example, the provision of electrical energy/power from the first battery 410 to the heater 340 may be actuated via an actuation of the actuation button 360 provided on the smoking device 300 or via an actuation of the puff-sensor 395, wherein the provision of electrical energy/power from the first battery 410 to the second battery 310, and hence the (re-)charging process—in this first embodiment—is initiated as soon as the first and second charging connectors 420, 320 are electrically connected to each other.

However, as mentioned before, in other embodiments, also the provision of electrical energy/power from the first battery 410 to the second battery 310, and hence the (re-)charging process, may be separately actuated via an additional button e.g. provided on the mobile charging part 400 or on the smoking device 300. Hence, in such other embodiments, a user/smoker/consumer may freely choose to power the heater 340 via the first battery 410 while the second battery 310 is not charged via the first battery 410 or while the second battery 310 is charged via the first battery 410. Furthermore, a user/smoker/consumer may also merely charge the second battery 310 via the first battery 410 without causing that energy/power is provided from the first battery 410 to heater 340.

As mentioned before, the heater 340 is electrically connected to the second battery 310 and to the second charging connector 320. In such an embodiment, the heater 340 of the smoking device 300 may advantageously be independently operated via energy/power stored in the first battery 410. Also already mentioned before, in this first embodiment, the electrical connection between the heater 340 and the second charging connector 320 comprises a switch which is individually controllable via the processing unit 315. Furthermore, also the electrical connection between the heater 340 and the second battery 310 comprises a switch that is individually controllable via the processing unit 315. Moreover, the electrical connection between the second battery 310 and the second charging connector 320 comprises a switch that is individually controllable by the processing unit 315.

In FIG. 16, a simplified electrical circuit is illustrated, indicating how the aforementioned components of the mobile charging part 400 and the smoking device 300 are electrically connected in a state in which the first and second charging connector 420, 320 are electrically connected to each other. Via dotted lines, it shall be schematically indicated in FIG. 16 that the switches coming to use in the electrical circuit may be individually switched via the processing unit 315.

In other embodiments of smoking apparatuses 500, the electrical connection between the heater 340 and the second charging connector 320 may be omitted. However, also in such an embodiment, the heater 340 may be powered in a state in which the second battery 310 is charged via the first battery 410, namely via a fraction of the energy/power provided by the first battery 410 to the second battery 310 in order to charge the second battery 310.

At this point, it shall be annotated that the electrical circuit shown in FIG. 16 is merely optional, and other electrical realizations of the invention may be realized. Hence, the aforementioned components may be connected in a manner that differs from the one shown in FIG. 16. Also—of course—further, i.e. additional or other electrical components may come to use, as the electrical circuit shown in FIG. 16 merely represents a schematic simplification of the electronics coming to use within the smoking apparatus 500.

As mentioned before, the processing unit 315 is further configured to allow for the heater 340 to be operated with energy/power that is stored in the second battery 310 when the first shell 401 and the second shell 301 are in a separated state in which the first and second charging connector 420, 320 are not electrically connected to each other. Hence, a user may advantageously smoke without the smoking device 300 being electrically connected to the mobile charging part 400, as long as there is enough energy/power within the second battery 310.

The switches described hereinbefore are exemplarily realized as power MOSFETs. However, they may also be realized as MOFETs, as other FETs, as bipolar transistors or as any other electrically controllable switches. Moreover, in this first embodiment, the processing unit 315 allowing for the aforementioned control operation is arranged within the smoking device 300. However, in other embodiments, the processing unit 315 described hereinbefore may also be arranged and/or integrated within the mobile charging part 400 of the smoking apparatus 500. Hence, the processing unit 315 configured to, among other things, cause that the heater 340 is provided with energy stored in the first battery 410 in a state in which the first and second charging connector 420, 320 are electrically connected to each other may also be provided in the mobile charging part 400.

In this first embodiment, the position of the first charging connector 420 within the first shell 401 is adjusted to the position of the second charging connector 320 within the second shell 301, such that the first charging connector 420 electrically connects to the second charging connector 320 when the second shell 301 is received within the receiving section 430. In such an embodiment, additional cables for an electrical connection between the first charging connector 420 and the second charging connector 320 may advantageously be omitted which increases the usability of the smoking apparatus 500. Expressed in other words, in this first embodiment, the first charging connector 420 is arranged within the aforementioned receiving section 430. Moreover, in this first embodiment, the second shell 301 is shaped such that it merely allows for the smoking device 300 to be inserted into the receiving section 430 when the smoking device 300 is in a specific, predetermined orientation with respect to the mobile charging part 400. This assures that the second charging connector 320 will necessarily be aligned with the first charging connector 420 when the smoking device 300 is inserted into the receiving section 430 of the mobile charging part 400.

As mentioned before, in this first embodiment, the first and the second charging connector 320, 420 each comprise two magnetic elements 321, 421 respectively. In such an embodiment, the magnetic elements 321, 421—or in more detail the magnetic attraction of the magnetic elements 321, 421—will automatically adjust the position of the first and second charging connector 420, 320 with respect to one another, such that the electric pins 422 of the first charging connector 420 electrically connect to the electric pins 322 of the second charging connector 320. In such an embodiment, the usability of the smoking apparatus 500 is further ameliorated.

In this first embodiment, the smoking device 300 further comprises a detector unit 350 (see FIG. 10) adapted to detect when the first and the second charging connector 420, 320 are electrically connected to each other. This e.g. allows for the processing unit 315 to automatically initiate the charging process of the second battery 310 via the first battery 410 upon the aforementioned detection. In this first embodiment, the detector unit 350 is exemplarily realized on the flexible PCB of the processing unit 315. However, it may also be realized differently, e.g. as an independent and separate component. Furthermore, it shall be annotated that the detector unit 350 is merely optional and may be omitted. Furthermore, a detector unit 350 providing for the aforementioned function or for any other function may also be provided in the mobile charging part 400.

In this first embodiment, the second shell 301 of the smoking device 300 comprises a first and a second shell part 302, 303 which together form the second shell 301. The two shell parts 302, 303 may be best appreciated in FIGS. 1 (right) and 10. The first shell part 302 comprises the receiving structure 330, the heater 340 and the second battery 310, wherein the second shell part 303 comprises the opening 335 through which solid smokable material 100 is removably insertable into the receiving structure 330. Furthermore, the second shell part 303 comprises a closing mechanism 336 adapted to controllably cover and uncover the opening 335 upon respective actuation of the closing mechanism 336. An advantage of such a closing mechanism 336 is that it allows to controllably close/seal and open the opening 335 arranged within the second shell part 303. Hence, the closing mechanism 336 allows for the opening 335 to be closed—when no heat stick is inserted—in order to prevent e.g. dirt from entering the opening 335.

The closing mechanism 336 may be best appreciated in FIGS. 2, 5, 6 and 10 and will be described in detail hereinafter.

In this first embodiment, the first and second shell part 302, 303 are rotatably connected to each other, wherein the closing mechanism 336 comprises a locking element 337 having at least one protrusion 338 slidably arranged within a guiding rail 339 provided within the second shell part 302, 303, respectively. In such an embodiment, the closing mechanism 336 may be easily actuated via a rotation of the second shell part 303 with respect to the first shell part 302 (FIG. 5), wherein merely simple and especially cheap components come to use. The locking element 337 covers the opening 335 when the second shell part 303 is in a first position with respect to the first shell part 302. Furthermore, the locking element 337 does not cover the opening 335 when the second shell part 303 is rotated to a second position with respect to the first shell part 302. Hence, whether the opening 335 is open or closed merely depends on the position of the second shell part 303 with respect to the first shell part 302. Such a closing mechanism 336 may easily be handled and merely necessitates a few components.

Figure 6:
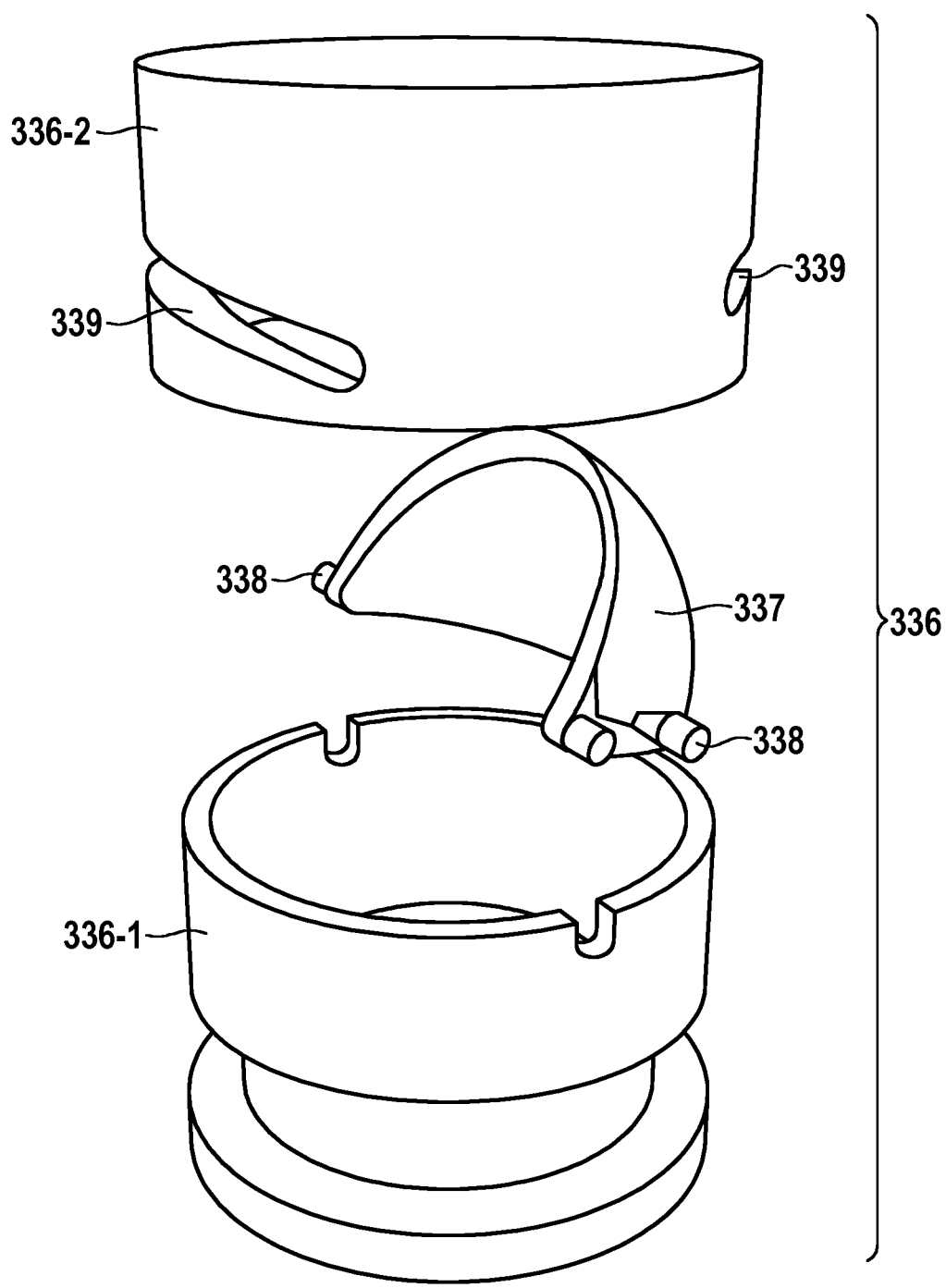
FIG. 6 shows an exploded view of the closing mechanism as mounted in the smoking device of the first embodiment of a smoking apparatus.

Described in more detail with respect to FIG. 6, the closing mechanism 336 comprises a static part 336-1 which is statically arranged within the first shell part 302. The static part 336-1 substantially has the shape of a pot with a ring shaped wall comprising two grooves for the reception of two protrusions of the locking element 337. When the closing mechanism 336 is actuated via a rotation of the second shell part 303 around a centreline thereof (using e.g. a first human hand) while the first shell part 302 is fixated (using e.g. a second human hand), the static part 336-1 does not move, as it is fixated within the first shell part 302. The locking element 337 has the shape of a lens or of a spherical sector, comprising four protrusions 338 in total which are arranged in a first and a second pair, respectively. The two protrusions 338 of a pair are arranged on opposing ends of the locking element 337, respectively. The outermost protrusions 338 of a first pair of protrusions 338 are arranged within the aforementioned grooves of the static part 336-1, whereas the remaining protrusions 338 of the other, second pair of protrusions 338 are arranged within the aforementioned guiding rail 339.

The guiding rail 339 is provided within ring shaped walls of a movable part 336-2 which also has the shape of a pot, the pot being inverted with respect to the static part 336-1, i.e. with an opening facing the opening of the static part 336-1. The movable part 336-2 is fixed within the second shell part 303, wherein the guiding rail 339 is formed by a groove that extends substantially helically within the ring shaped walls of the movable part 336-2, meaning that the groove helically extends along a fraction of a centreline of the smoking device 300. When the second shell part 303 with the movable part 336-2 therein is rotated while the first shell part 302 with the static part 336-1 therein is fixated, the second pair of protrusions 338 arranged within the guiding rail 339 is pushed upwards or downwards (depending on the direction of rotation), such that the locking element 337 is either tilted to a first position, in which the locking element 337 blocks the opening 335, or tilted to a second position, in which the locking element 337 does not block the opening 335.

In FIG. 5, the closing mechanism 336 is illustrated in a mounted state. Left in FIG. 5, the locking element 337 is arranged in the first position and hence in front of the opening 335 such that a heat stick may not be inserted therein and dirt is prevented from entering the opening 335. In the middle/center of FIG. 5, it is illustrated an intermediate state of the closing mechanism (and hence of the "closing in process"), the locking element 337 being tilted from the first position to the second position which is achieved via a clockwise rotation of the second shell part 303 while the first shell part 302 is fixated. Right in FIG. 5 is shown a state of the smoking device 300 in which the locking element 337 is in the second position, such that a heat stick may be inserted into the opening 335, as is shown in FIG. 5 (right).

The closing mechanism 336 described hereinbefore is merely one of a plurality of possible alternatives that allow to open and close an insertion opening of a smoking apparatus. In other embodiments of smoking apparatuses, a closing mechanism may comprise a slidable door, a hinged door, a plug like closure or any other closing mechanism. Furthermore, in other embodiments, a closing mechanism may be omitted.

Figure 7:
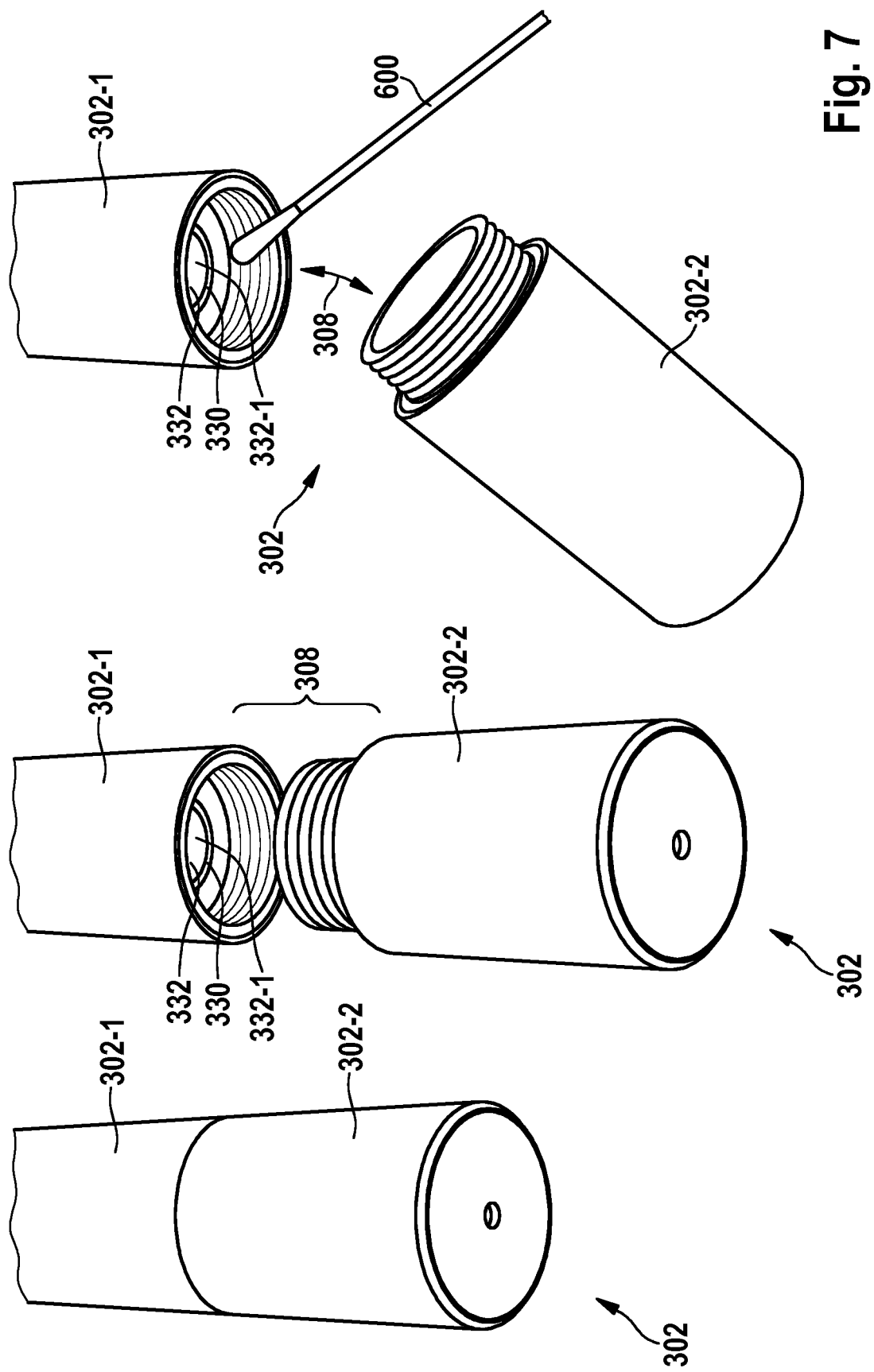
FIG. 7 shows the process of cleaning the receiving structure of the smoking device of the first embodiment of a smoking apparatus.

In this first embodiment, the first shell part 302 is further sub-divided into a first and a second sub-part 302-1, 302-2 which are connectable to each other via a screw-fit connection 308, wherein the first sub-part 302-1 comprises the receiving structure 330 and the heater 340 and wherein the second sub-part 302-2 comprises the second battery 310 (see FIGS. 1 and 7). In such an embodiment, the smoking device 300 may easily be dismantled which eases inter alia a cleaning of the smoking device 300 or of the components thereof. In other embodiments, said first and second sub-part 302-1, 302-2 may be connectable to each other via another kind of connection, e.g. via a push-fit connection.

Furthermore—as mentioned before with respect to FIG. 11—in this first embodiment, the receiving structure 330 comprises a first end 331 with a first opening 331-1 facing the opening 335 of the second shell part 303 and a second end 332 opposing the first end 331, the second end 332 comprising a second opening 332-1 which is accessible via a cleaning tool 600 when the first and the second sub-part 302-1, 302-2 are separated from one another and not connected to each other. In such an embodiment, especially the receiving structure 330 may easily be cleaned.

In FIG. 7, a cleaning process for the receiving structure 330 is illustrated, according to which the second sub-part 302-2 is screwed off the first sub-part 302-1 which gives free the second opening 332-1 of the receiving structure 330. Via a cleaning tool 600, which in FIG. 7 exemplarily corresponds to a cotton bud, the receiving structure 330 may then be accessed and cleaned.

Figure 8:
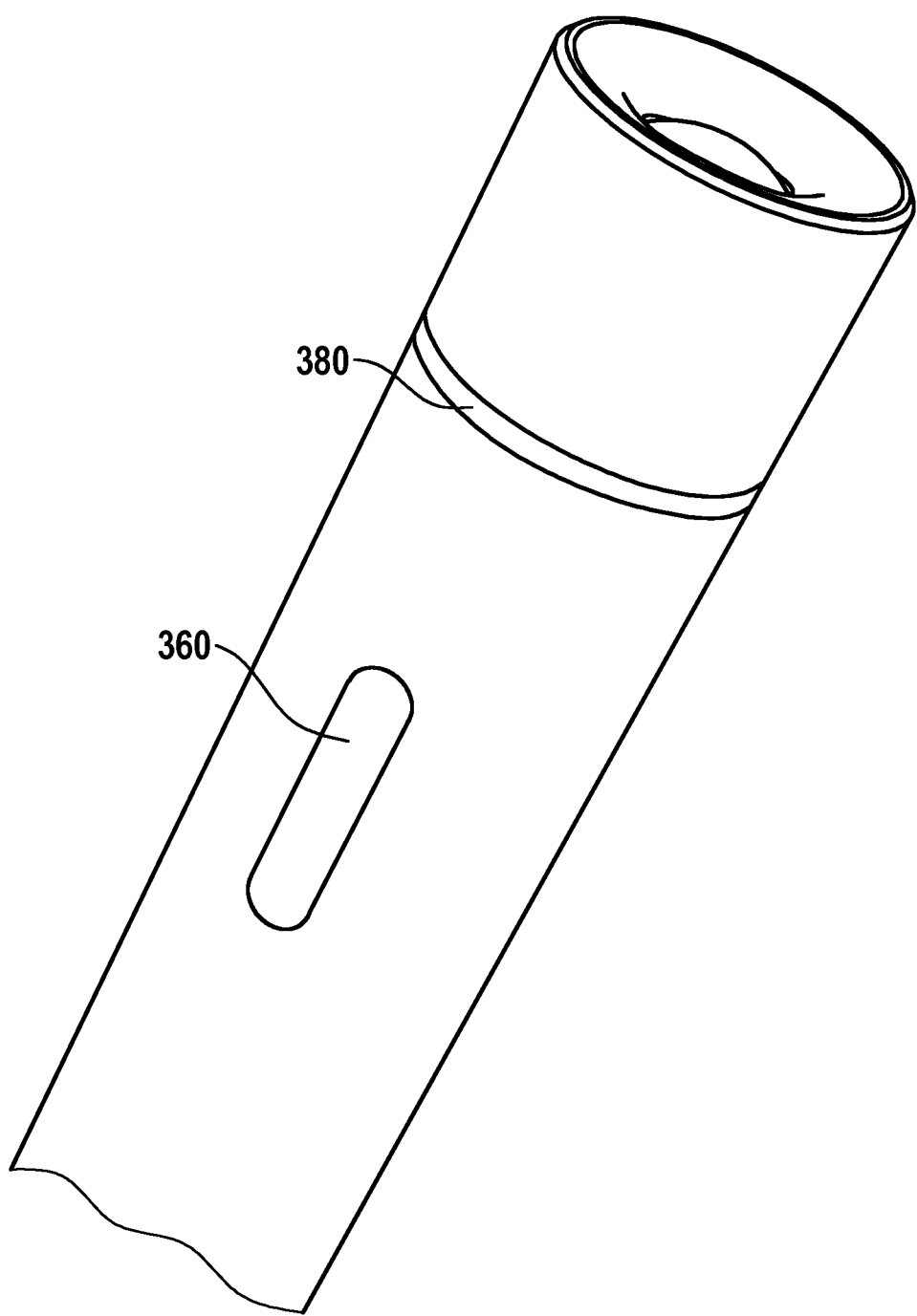
FIG. 8 shows a light indicator of the smoking device of the first embodiment of a smoking apparatus.
Figure 9:
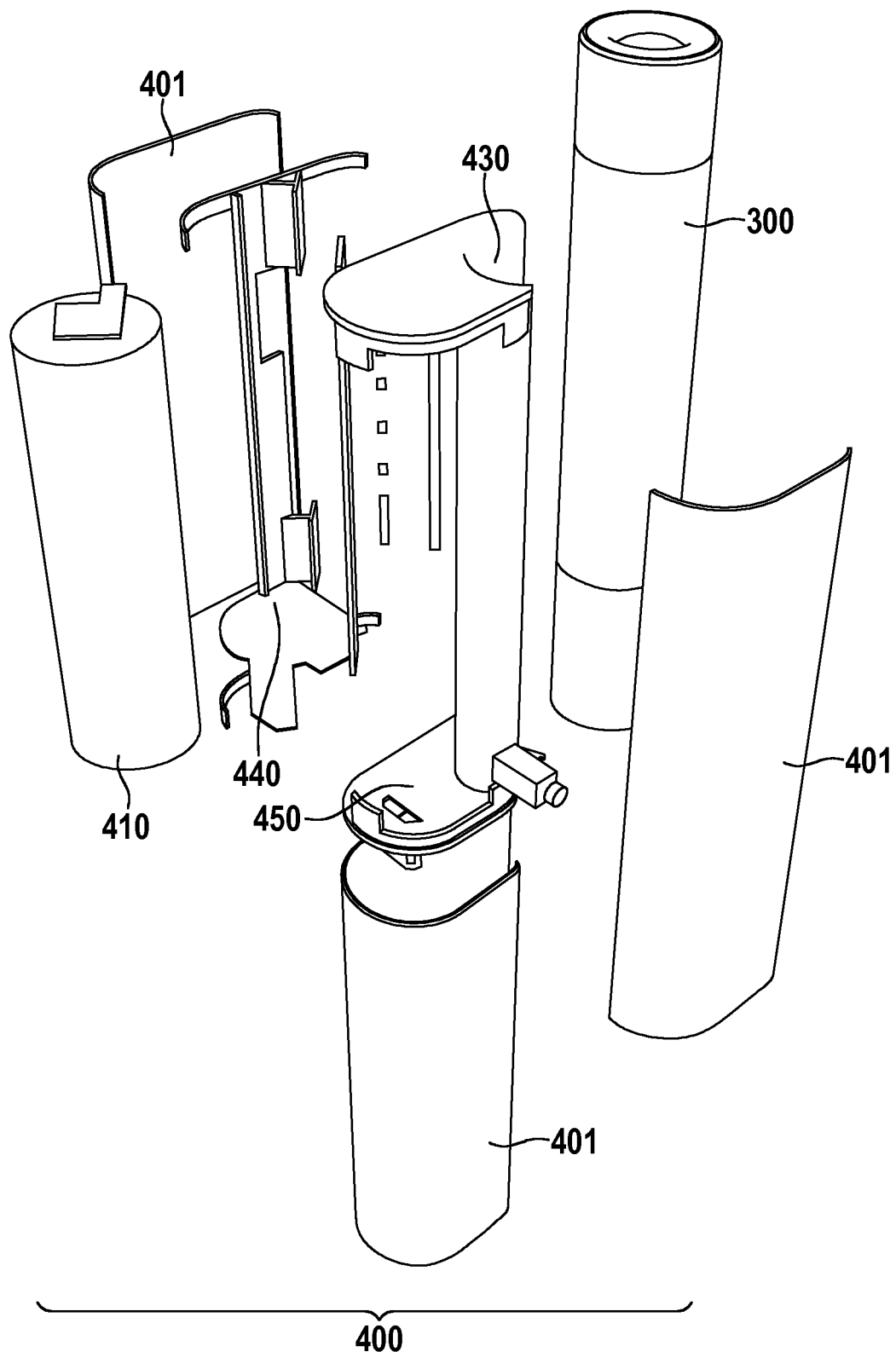
FIG. 9 shows an exploded view of the mobile charging part of the first embodiment of a smoking apparatus.

In FIG. 8, a light indicator 380 of the smoking device 300 is shown. In this first embodiment, the light indicator 380 comprises a plurality of light emitting diodes, LEDs (not visible in FIG. 8), which are arranged in a ring shape around the circumference of the smoking device 300. The LEDs are covered by a ring shaped translucent plastic. In this first embodiment, the light indicator 380 is exemplarily powered/operated as soon as the paff-sensor 395 senses that a user drags air through the airflow channel 390. However, any other light indicator may come to use, which may be arranged at a different position at the smoking apparatus 500 and which may also indicate any other activity or state of the smoking device 300, e.g. that the smoking device 300 is turned on, that the heater 340 of the smoking device 300 is operated or the like. Furthermore, there is not need to mention that a light indicator may also be provided on the mobile charging part 400.

Figure 12:
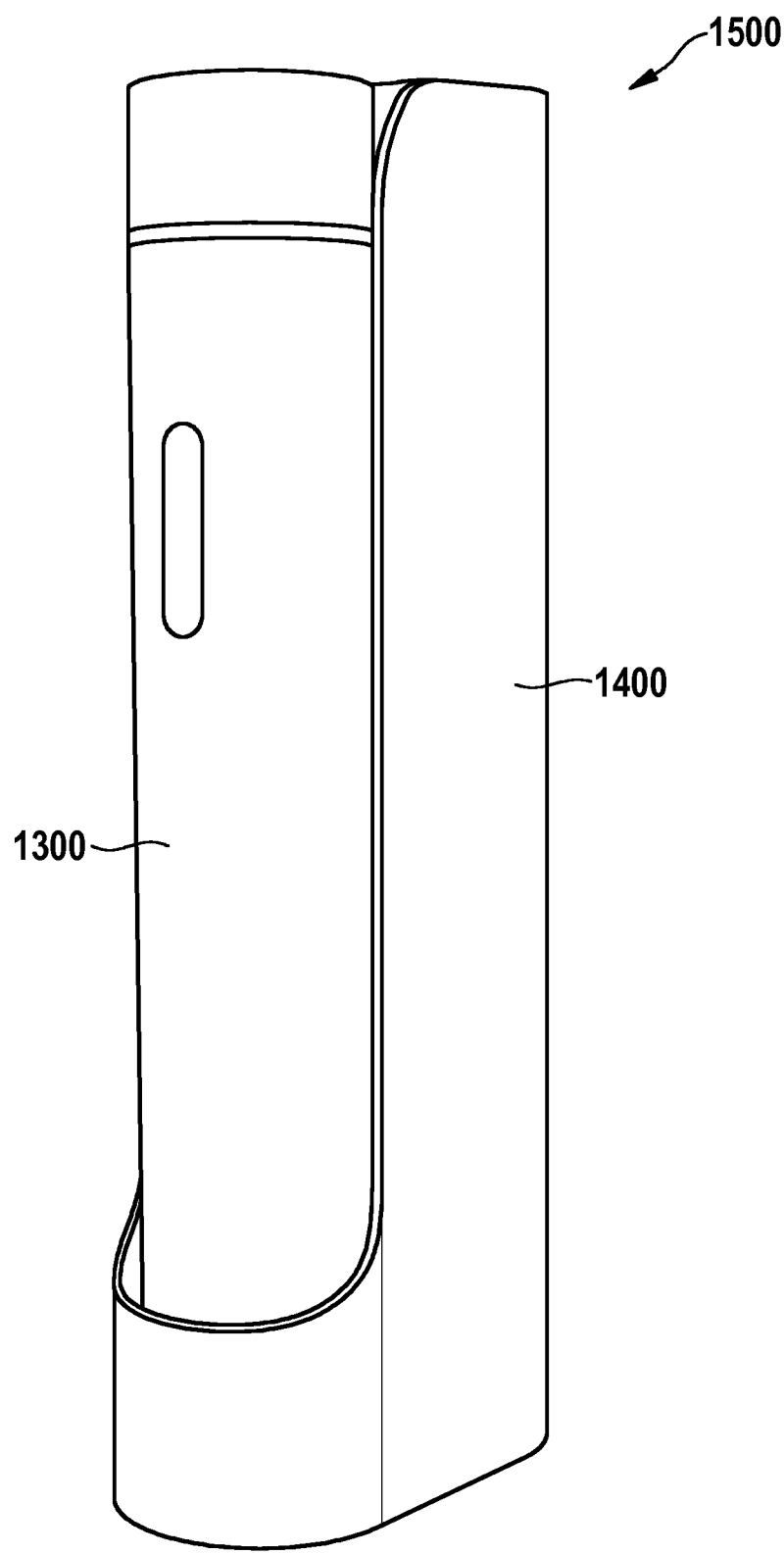
FIG. 12 shows a second embodiment of a smoking apparatus.

In FIG. 12, a second embodiment of a smoking apparatus 1500 is illustrated. In this second embodiment, the mobile charging part 1400 and the smoking device 1300 substantially have the same length. Furthermore, in this second embodiment, the mobile charging part 1400 comprises a different receiving section which circumferentially encloses a lower portion of the smoking device 1300 when the same is inserted into the mobile charging part 1400.

Figure 13:
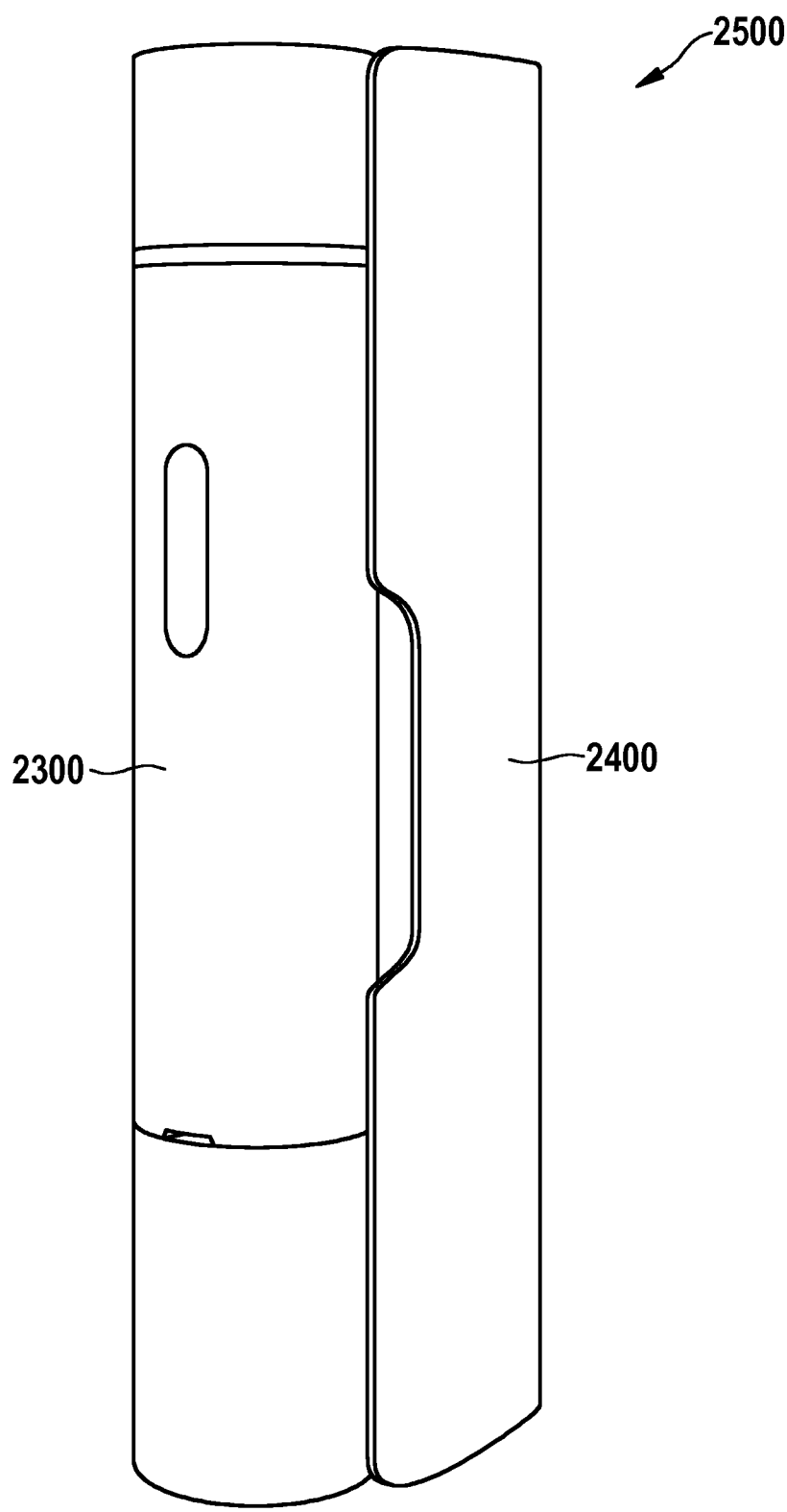
FIG. 13 shows a third embodiment of a smoking apparatus.

In FIG. 13, a third embodiment of a smoking apparatus 2500 is illustrated. Also in this third embodiment, the mobile charging part 2400 and the smoking device 2300 substantially have the same length. However, in this third embodiment, the receiving section of the mobile charging part 2400 does not circumferentially enclose any portion of the smoking device 2300 when the same is inserted into the mobile charging part 2400, but instead comprises a cavity within the first shell provided adjacent to the smoking device 2300 when the same is inserted into the mobile charging part 2300. The aforementioned cavity allows to more easily grab for the smoking device 2300 in order to disconnect/separate it from the mobile charging part 2400.

Figure 14:
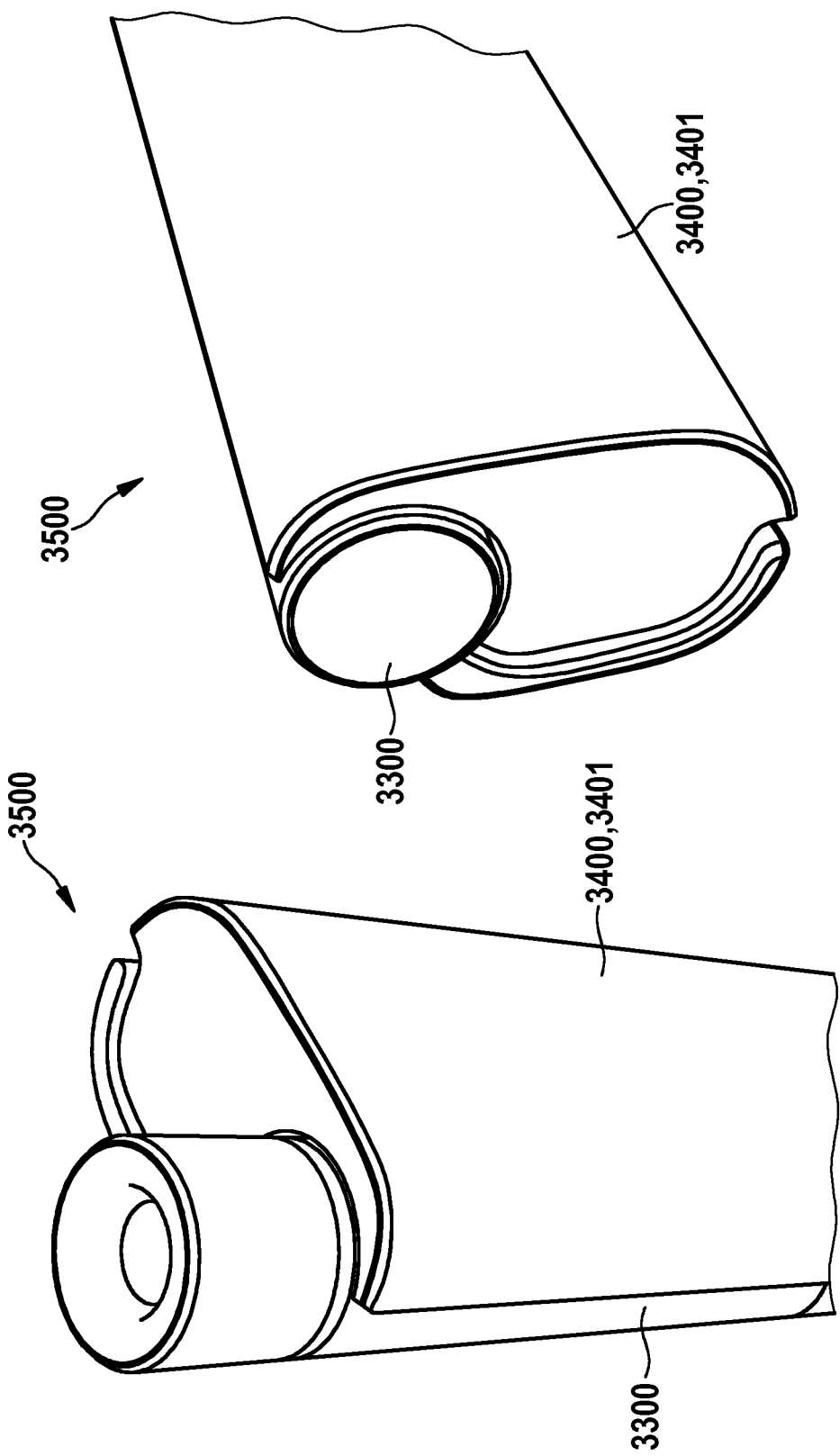
FIG. 14 shows two different illustrations of a fourth embodiment of a smoking apparatus.

In FIGS. 14 and 15, a fourth embodiment of a smoking apparatus 3500 is illustrated. In this fourth embodiment, the size and dimension of the smoking device 3300 and of the mobile charging part 3400 are substantially identical to the size and dimension of the smoking device 300 and the mobile charging part 400 of the first embodiment described hereinbefore, respectively. However, in this fourth embodiment, the first shell 3401 of the mobile charging part 3400 comprises a movable, hinged or jointed sidewall which allows clamping the smoking device 3300 within the receiving section of the mobile charging part 3400. On the left side of FIG. 15, the clamp of the mobile charging part 3400 is illustrated in a closed state. In such a closed state, the smoking device 3300 is fixated within the mobile charging part 3400 and may not be removed therefrom, which is illustrated in FIG. 14. On the right side of FIG. 15, the clamp of the mobile charging part 3400 is illustrated in an opened state. In such an opened state, the smoking device 3300 is not fixated within the mobile charging part 3400 and may be released/removed therefrom.

The components coming to use in the second, third and fourth embodiments of smoking apparatuses 1500, 2500, 3500 described hereinbefore substantially correspond to the components coming to use within the first embodiment of the smoking apparatus 500 which have been described in detail hereinbefore. Hence, a description of these components may be omitted. In all embodiments described herein, the mobile charging part 400, 1400, 2400, 3400 and/or the smoking device 300, 1300, 2300, 3300 may comprise an interface or terminal for the connection to an external power source which allows to recharge the first battery 410 thereof. In FIG. 14 (right), such an interface/terminal is exemplarily visible.

It is provided a smoking apparatus adapted to heat a solid smokable material to volatilize at least one component thereof. The apparatus comprises a mobile charging part provided in a first shell. The mobile charging part comprises a first battery, and a first charging connector electrically connected to the first battery. Furthermore, the apparatus comprises a smoking device provided in a second shell being separate from the first shell. The smoking device comprises a second battery electrically connected to a processing unit and to a second charging connector electrically connectable to the first charging connector. Furthermore, the smoking device comprises a receiving structure adapted to removably receive solid smokable material, and a heater operable to heat solid smokable material received within the receiving structure. The processing unit is configured to cause that the heater is provided with energy stored in the first battery in a state in which the first and second charging connector are electrically connected to each other.

An advantage of such a smoking apparatus may be that a user/smoker/consumer does not need to wait for the second battery of the smoking device to be recharged when the same runs out of power/energy to smoke further heat sticks. Expressed in other words, the smoking apparatus described herein allows a user to consume several sticks in succession, as energy of the first battery is available when the second battery of the smoking device is discharged.

Preferably, in a state, in which the first and second charging connector connectors are connected to each other, the second battery is chargeable via the first battery, wherein the processing unit is configured to allow for the heater to be operated while the second battery is charged via the first battery. An advantage of that may be that a user/smoker/consumer may smoke using the smoking device while the second battery is electrically recharged via the first battery. Hence, a user/smoker/consumer who wants to continue smoking heat sticks after the second battery ran out of energy/power does a) not have to wait until the second battery has been (fully) recharged to smoke again and b) further does not have to postpone the process of recharging the second battery to a point in time at which the user/smoker/consumer does not want to smoke anymore, as both (smoking and charging) is possible at the same time.

In a preferred embodiment, the processing unit is configured to cause that the heater is provided with energy stored in the first battery while the second battery is charged via the first battery in a state in which the first and second charging connectors are electrically connected to each other. An advantage of that may be that energy/power of the second battery is advantageously not used to power the heater of the smoking device in a state in which the first and second charging connectors are electrically connected.

Furthermore preferred, the heater is electrically connected to the second battery and to the second charging connector. In such an embodiment, the heater of the smoking device may directly be powered via the first battery without that energy provided by the first battery needs to be diverted via the second battery.

Preferably, the processing unit is further configured to allow for the heater to be operated with energy that is stored in the second battery when the first shell and the second shell are in a separated state in which the first and second charging connectors are not electrically connected to each other. An advantage of that may be that the heater of the smoking device may also be powered when the mobile charging part is not connected to the smoking device.

In a preferred embodiment, the first shell comprises a receiving section that is adapted to removably receive the second shell therein. An advantage of that may be that the smoking device may easily and safely be carried around within the mobile charging part.

Preferably, the receiving section has a shape that is at least in part adjusted to the outer shape of at least a part of the second shell. An advantage of such an adjustment of the shapes of said components is that the smoking device easily engages with the receiving section of the mobile charging part.

In a preferred embodiment, the receiving section is substantially C-shaped wherein the second shell is substantially rod-shaped. An advantage of that may be that the rod-shaped smoking device may easily be slidden into the C-shaped receiving section of the mobile charging part.

Preferably, the position of the first charging connector within the first shell is adjusted to the position of the second charging connector within the second shell, such that the first charging connector electrically connects to the second charging connector when the second shell is received within the receiving section. An advantage of that may be that additional cables for an electrical connection between the first charging connector and the second charging connector may be omitted which increases the usability of the smoking apparatus.

In a preferred embodiment, the first and the second charging connectors comprise at least one magnetic element respectively. An advantage of that may be that—when the first and the second charging connectors are brought into close proximity to one another—the magnetic attraction of the magnetic elements will automatically adjust the position of the first and second charging connectors with respect to one another, such that the electric pins of the first charging connector are electrically connected to the electric pins of the second charging connector.

Preferably, the smoking device and/or the mobile charging part further comprises a detector unit adapted to detect when the first and the second charging connectors are electrically connected to each other. An advantage of that may be that such a detector unit e.g. allows for the processing unit to (automatically) initiate the charging process of the second battery via the first battery.

In a preferred embodiment, the second shell comprises at least a first and a second shell part which together form the second shell. The first shell part comprises the receiving structure, the heater and the second battery. The second shell part comprises an opening through which solid smokable material is removably insertable into the receiving structure, and a closing mechanism adapted to controllably cover and uncover the opening upon respective actuation of the closing mechanism. An advantage of such a closing mechanism may be that it allows to controllably close/seal and open the opening arranged within the second shell part. Hence, the closing mechanism allows for the opening to be closed—when no heat stick is inserted—in order to prevent e.g. dirt from entering the opening.

Preferably, the first and second shell part are rotatably connected to each other, wherein the closing mechanism comprises a locking element having at least one protrusion slidably arranged within a guiding rail provided within the second shell part, respectively. An advantage of such a closing mechanism may be that it can be easily actuated via a rotation of the second shell part with respect to the first shell part, wherein merely simple and especially cheap components come to use.

In a preferred embodiment, the locking element covers the opening when the second shell part is in a first position with respect to the first shell part. Furthermore preferred, the locking element does not cover the opening when the second shell part is rotated to a second position with respect to the first shell part. An advantage of that may be that such a closing mechanism may easily be handled and merely necessitates a few components.

Preferably, smoke in the aforementioned sense comprises an aerosol. Furthermore preferred, smoke in the aforementioned sense represents or consists of an aerosol.

Preferably, the first shell part is further sub-divided into a first and a second sub-part which are connectable to each other via a screw-fit connection, wherein the first sub-part comprises the receiving structure and the heater and wherein the second sub-part comprises the second battery. An advantage of that may be that the smoking device may easily be dismantled which eases inter alia a cleaning of the smoking device or of the components thereof.

In a preferred embodiment, the receiving structure comprises a first end with a first opening facing the opening of the second shell part and a second end opposing the first end, the second end comprising a second opening which is accessible via a cleaning tool when the first and the second sub-part are separated from one another and not connected to each other. An advantage of that may be that especially the receiving structure may easily be cleaned.

While this invention has been described in connection with what is presently considered to be practical exemplary embodiments, it is to be understood that the invention is not limited to the disclosed embodiments, but, on the contrary, is intended to cover various modifications and equivalent arrangements included within the scope of the appended claims.

LIST OF REFERENCE SIGNS

| | |
|---|---|
| 600 | cleaning tool |
| 500, 1500, 2500, 3500 | smoking apparatus |
| 450 | shell frame |
| 440 | battery holding frame |
| 430 | receiving section |
| 422 | pin of first charging connector |
| 421 | magnetic element |
| 420 | first charging connector |
| 410 | first battery |
| 401, 3401 | first shell |
| 400, 1400, 2400, 3400 | mobile charging part |
| 395 | puff-sensor |
| 390 | airflow channel |
| 380 | light indicator |
| 370 | air inlet |
| 360 | actuation button |
| 350 | detector unit |
| 345 | heating chamber |
| 340 | heater |
| 339 | guiding rail |
| 338 | protrusion |
| 337 | locking element |
| 336-2 | movable part |
| 336-1 | static part |
| 336 | closing mechanism |
| 335 | opening |
| 332-1 | second opening |
| 332 | second end |
| 331-1 | first opening |
| 331 | first end |
| 330 | receiving structure |
| 322 | pin of second charging connector |
| 321 | magnetic element |
| 320 | second charging connector |
| 315 | processing unit |
| 310 | second battery |
| 308 | screw-fit connection |
| 303 | second shell part |
| 302-2 | second sub-part |
| 302-1 | first sub-part |
| 302 | first shell part |
| 301 | second shell |
| 300, 1300, 2300, 3300 | smoking device |
| 100 | solid smokable material |

The invention claimed is:

1. A smoking apparatus adapted to heat a solid smokable material to volatilize at least one component thereof, the apparatus comprising:
   a mobile charging part comprising a first shell having a first shell exterior surface, the mobile charging part further comprising
      a receiving section formed in the first shell exterior surface,
      a first battery, and
      a first charging connector electrically connected to the first battery;

a smoking device comprising a second shell having a second shell exterior surface and being separate from the first shell, the smoking device further comprising
a second battery electrically connected to a processing unit and to a second charging connector electrically connectable to the first charging connector,
a receiving structure adapted to removably receive the solid smokable material, and
a heater operable to heat the solid smokable material received within the receiving structure,
wherein the processing unit is configured to cause that the heater is provided with energy stored in the first battery in a state in which the first and second charging connectors are electrically connected to each other, and
wherein the receiving section is adapted to complementarily and removably receive thereagainst less than all of the second shell exterior surface, whereby a longitudinally extending portion of the second shell exterior surface remains uncovered by the first shell when the smoking device is connected to the mobile charging part.

2. The smoking apparatus of claim 1, wherein in the state in which the first and second charging connector are electrically connected to each other, the second battery is chargeable via the first battery, and wherein the processing unit is configured to allow for the heater to be operated while the second battery is charged via the first battery.

3. The smoking apparatus of claim 2, wherein the processing unit is configured to cause that the heater is provided with energy stored in the first battery while the second battery is charged via the first battery in the state in which the first and second charging connector are electrically connected to each other.

4. The smoking apparatus of claim 1, wherein the heater is electrically connected to the second battery and to the second charging connector.

5. The smoking apparatus of claim 1, wherein the processing unit is further configured to allow for the heater to be operated with energy that is stored in the second battery when the first shell and the second shell are in a separated state in which the first and second charging connector are not electrically connected to each other.

6. The smoking apparatus of claim 1, wherein the receiving section is substantially C-shaped and wherein the second shell is substantially rod-shaped.

7. The smoking apparatus of claim 1, wherein a position of the first charging connector within the first shell is adjusted to a position of the second charging connector within the second shell, such that the first charging connector electrically connects to the second charging connector when the second shell is received within the receiving section.

8. The smoking apparatus of claim 1, wherein each of the first and the second charging connectors comprises at least one magnetic element respectively.

9. The smoking apparatus of claim 1, wherein the smoking device or the mobile charging part further comprises a detector unit adapted to detect when the first and the second charging connector are electrically connected to each other.

10. The smoking apparatus of claim 1, wherein the second shell comprises at least a first shell part and a second shell part which together form the second shell, the first shell part comprising
the receiving structure,
the heater and
the second battery,
wherein the second shell part comprises
an opening through which the solid smokable material is removably insertable into the receiving structure, and
a closing mechanism adapted to controllably cover and uncover the opening upon respective actuation of the closing mechanism.

11. The smoking apparatus of claim 10, wherein the first and second shell part are rotatably connected to each other, and wherein the closing mechanism comprises a locking element having at least one protrusion slidably arranged within a guiding rail provided within the second shell part, respectively.

12. The smoking apparatus of claim 11, wherein the locking element covers the opening when the second shell part is in a first position with respect to the first shell part and wherein the locking element does not cover the opening when the second shell part is rotated to a second position with respect to the first shell part.

13. The smoking apparatus of claim 10, wherein the first shell part is further sub-divided into a first and a second sub-part which are connectable to each other via a screw-fit connection, wherein the first sub-part comprises the receiving structure and the heater and wherein the second sub-part comprises the second battery.

14. The smoking apparatus of claim 13, wherein the receiving structure comprises a first end with a first opening facing the opening of the second shell part and a second end opposing the first end, the second end comprising a second opening which is accessible via a cleaning tool when the first and the second sub-part are separated from one another and not connected to each other.

15. A mobile charger adapted to charge a smoking device, the mobile charger comprising:
a shell having an exterior surface,
a receiving section formed in the shell exterior surface and being adapted to complementarily and removably receive thereagainst less than all of an exterior surface of the smoking device;
a first battery; and
a first charging connector electrically connected to the first battery, the first charging connector configured to be electrically connected to a second charging connector of the smoking device when the smoking device is received within the receiving section.

16. The mobile charger of claim 15, wherein first charging connector comprises at least one first magnetic element, wherein the second charging connector comprises at least one second magnetic element, and wherein the first and second magnetic elements are adapted to be attracted to each another such that the first charging connector electrically connects to the second charging connector.

17. The mobile charger of claim 15, wherein, in a state in which the first charging connector is electrically connected to the second charging connector, the first battery is configured to charge a second battery of the smoking device, and wherein the smoking device is configured to be operated while the first battery charges the second battery.

18. A smoking apparatus adapted to heat a solid smokable material to volatilize at least one component thereof, the apparatus comprising:
a mobile charging part provided in a first shell, the mobile charging part comprising
a first battery, and
a first charging connector electrically connected to the first battery;
a smoking device provided in a second shell being separate from the first shell, the smoking device comprising a second battery electrically connected to a processing unit and to a second charging connector electrically connectable to the first charging connector, a receiving structure adapted to removably receive the solid smokable material, and a heater operable to heat the solid smokable material received within the receiving structure, wherein the second shell comprises at least a first shell part and a second shell part, which together form the second shell, wherein the first shell part comprises the receiving structure, the heater, and the second battery; and wherein the second shell part comprises an opening through which the solid smokable material is removably insertable into the receiving structure, and a closing mechanism adapted to controllably cover and uncover the opening upon respective actuation of the closing mechanism; and wherein the processing unit is configured to cause that the heater is provided with energy stored in the first battery in a state in which the first and second charging connectors are electrically connected to each other.

19. The smoking apparatus of claim 18, wherein the processing unit is configured to cause that the heater is provided with energy stored in the first battery while the second battery is charged via the first battery in the state in which the first and second charging connector are electrically connected to each other.

20. The smoking apparatus of claim 18, wherein the processing unit is further configured to allow for the heater to be operated with energy that is stored in the second battery when the first shell and the second shell are in a separated state in which the first and second charging connector are not electrically connected to each other.

* * * * *